US012803284B2

(12) United States Patent
Okuda et al.

(10) Patent No.: US 12,803,284 B2
(45) Date of Patent: Nov. 17, 2026

(54) IN-VEHICLE CHARGING SYSTEM

(71) Applicant: Astemo, Ltd., Tokyo (JP)

(72) Inventors: Yuki Okuda, Hitachinaka (JP); Shogo Miyamoto, Hitachinaka (JP); Yasuaki Sato, Hitachinaka (JP); Takashi Okada, Hitachinaka (JP); Hiroyuki Ooiwa, Hitachinaka (JP)

(73) Assignee: Astemo, Ltd., Tokyo (JP)

( * ) Notice: Subject to any disclaimer, the term of this patent is extended or adjusted under 35 U.S.C. 154(b) by 0 days.

(21) Appl. No.: 19/132,502

(22) PCT Filed: Nov. 24, 2022

(86) PCT No.: PCT/JP2022/043419
§ 371 (c)(1),
(2) Date: May 23, 2025

(87) PCT Pub. No.: WO2024/111098
PCT Pub. Date: May 30, 2024

(65) Prior Publication Data
US 2026/0204908 A1 Jul. 16, 2026

(51) Int. Cl.
*H02J 3/14* (2026.01)
*B60L 1/00* (2006.01)
(Continued)

(52) U.S. Cl.
CPC ................ *H02J 3/14* (2013.01); *B60L 1/003* (2013.01); *B60L 53/62* (2019.02); *B60L 53/63* (2019.02); *B60L 55/00* (2019.02)

(58) Field of Classification Search
CPC ........................................................ H02J 3/14
(Continued)

(56) References Cited

U.S. PATENT DOCUMENTS

2012/0299373 A1* 11/2012 Yoshida ................ B60L 53/126 307/9.1
2022/0020082 A1* 1/2022 Kataoka ................ G06Q 50/40
(Continued)

FOREIGN PATENT DOCUMENTS

JP 2012-75282 A 4/2012
JP 5168891 B2 3/2013
JP 2019-30136 A 2/2019

OTHER PUBLICATIONS

International Search Report dated Feb. 7, 2023 for PCT International Application No. PCT/JP2022/043419.

*Primary Examiner* — Joseph Chang
(74) *Attorney, Agent, or Firm* — Volpe Koenig

(57) ABSTRACT

An in-vehicle charging system charges an electric vehicle battery with electric power supplied from a home and includes: an external environment recognition unit on the electric vehicle and detects external environment information regarding an external environment around the electric vehicle; an information acquiring unit that acquires device information regarding an electric device provided in the home; a power consumption estimating unit that calculates a power consumption estimation value of the electric device provided in the home upon charging the battery based the external environment information and the device information; and a charging power determination unit that determines a charging plan for the battery based on the power consumption estimation value. The charging power determination unit determines the charging plan such that a sum of charging power of the battery and the power consumption estimation value falls below an upper limit value of electric power consumable in the home.

11 Claims, 16 Drawing Sheets

(51) Int. Cl.

| | |
|---|---|
| ***B60L 53/62*** | (2019.01) |
| ***B60L 53/63*** | (2019.01) |
| ***B60L 55/00*** | (2019.01) |

(58) Field of Classification Search

USPC ........................................................... 307/9.1

See application file for complete search history.

(56) References Cited

U.S. PATENT DOCUMENTS

| | | | | |
|---|---|---|---|---|
| 2022/0048399 | A1* | 2/2022 | Nishita .................. | B60L 53/64 |
| 2023/0093893 | A1* | 3/2023 | Iguchi .................... | B60L 58/16<br>705/7.22 |

* cited by examiner

IN-VEHICLE CHARGING SYSTEM

TECHNICAL FIELD

The present invention relates to an in-vehicle charging system.

BACKGROUND ART

Conventionally, a charging system that charges a battery of an electric vehicle using electric power supplied into a home from the outside has been known (see, for example, PTL 1). The home is provided with a power detection device provided between a distribution board and an in-home power load, and an electric vehicle charger including a charging controller, a converter, a charging paddle, and the like. The charging controller constantly senses the power load status of the in-home power load via the power detection device.

When the battery of an electric vehicle is charged, the paddle of the electric vehicle charger is connected to an inlet of the electric vehicle. The charging controller provided in the electric vehicle charger receives a signal related to a battery state or the like from the electric vehicle via a communication antenna, calculates charging power for the electric vehicle, and transmits a control signal thereof to the electric vehicle.

CITATION LIST

Patent Literature

PTL 1: JP 5168891 B2

SUMMARY OF INVENTION

Technical Problem

However, in the device described in PTL 1, a special facility such as the power detection device that detects a power load status of the in-home power load and the charging controller that calculates charging power is required in the home.

Solution to Problem

An in-vehicle charging system according to an aspect of the present invention charges a battery mounted on an electric vehicle with electric power supplied from a home, the in-vehicle charging system including: an external environment recognition unit that is mounted on the electric vehicle and detects external environment information regarding an external environment around the electric vehicle; an information acquiring unit that acquires device information regarding an electric device provided in the home; a power consumption estimating unit that calculates a power consumption estimation value of the electric device provided in the home upon charging the battery on the basis of the external environment information and the device information; and a charging power determination unit that determines a charging plan for the battery based on the power consumption estimation value, in which the charging power determination unit determines the charging plan in such a manner that a sum of charging power of the battery and the power consumption estimation value falls below an upper limit value of electric power consumable in the home.

Advantageous Effects of Invention

The present invention enables estimation of an amount of electric power consumed in the home and generation of a charging plan with the electric vehicle alone without requiring a device that estimates an amount of electric power consumed in the home and that generates a charging plan.

DESCRIPTION OF EMBODIMENTS

Figure 1:
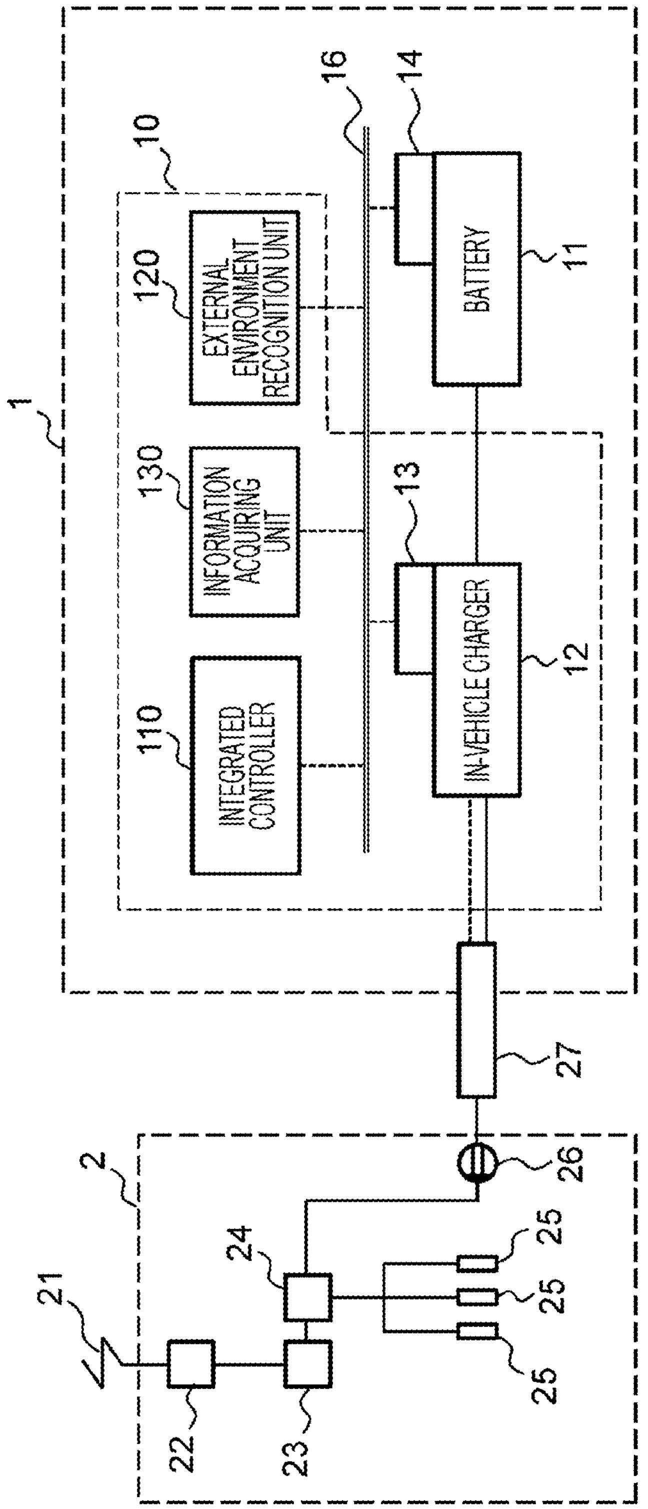
FIG. 1 is a diagram for describing a first embodiment of the present invention.

Embodiments of a semiconductor device according to the present invention will be described below with reference to the drawings. The following description and drawings are examples for describing the present invention, and are partially simplified or omitted, as appropriate, for the sake of clarity of description. In the following description, the same or similar elements and processes are denoted by the same reference numerals, and redundant description may be omitted. Note that the following description indicates merely examples of embodiments of the present invention, and the present invention is not limited to the following embodiments and can be implemented in various other modes.

First Embodiment

FIG. 1 is a diagram for describing a first embodiment of the present invention, and illustrates device configurations of an electric vehicle 1 and a home 2. The home 2 trades electricity from an electric power company through a power system 21. A distribution board 24 provided in the home 2 is connected to the power system 21 via an electric power meter 22 for measuring sold and purchased electricity and an ampere breaker 23 for cutting off an electric power supply when the electricity exceeds an electric power capacity contracted with the electric power company. The distribution board 24 distributes electricity to an electric load 25 and an outlet 26 used in the home 2.

The electric vehicle 1 includes an in-vehicle charging system 10 including an in-vehicle charger 12 and a battery 11 for driving the vehicle. The in-vehicle charger 12 includes a charger controller 13 for controlling a voltage and a current when charging the battery 11. The battery 11 includes a battery sensor 14 for monitoring a battery state.

The in-vehicle charging system 10 further includes an integrated controller 110, an external environment recognition unit 120, and an information acquiring unit 130. The integrated controller 110, the external environment recognition unit 120, and the information acquiring unit 130 are configured to be able to communicate with the charger controller 13 and the battery sensor 14 via a communication bus 16. The details of the integrated controller 110, the external environment recognition unit 120, and the information acquiring unit 130 will be described later. The integrated controller 110 includes an arithmetic unit including a CPU and the like and a storage unit including a memory such as a RAM and a ROM and a recording medium such as a hard disk and a CD-ROM, and functions as the integrated controller 110 by executing a program stored in the storage unit.

When charging the battery 11 of the electric vehicle 1, the in-vehicle charger 12 is connected to the outlet 26 of the home 2 via a charging cable 27. Although not illustrated, the charging cable 27 includes a control box. The control box checks a connection state with the electric vehicle 1 and notifies the charger controller 13 and the integrated controller 110 of information such as whether electric power can be supplied or not and a value of current that can be supplied to the electric vehicle 1. The integrated controller 110 generates a charging plan for charging the battery as described later.

The charger controller 13 acquires the state of charge and the temperature of the battery 11 through the battery sensor 14. When the charger controller 13 receives a notification indicating that electric power supply is possible with the charging cable 27, the in-vehicle charger 12 charges the battery 11. The charger controller 13 charges the battery 11 by controlling the voltage and current of the in-vehicle charger 12 on the basis of the charging plan generated by the integrated controller 110 and the state of charge and temperature of the battery 11 that has been acquired.

<External Environment Recognition Unit 120>

The external environment recognition unit 120 is an in-vehicle sensor provided in the electric vehicle 1, and includes, for example, a camera, a radar, a global positioning system (GPS) device, an acceleration sensor, and the like in addition to an air temperature sensor, an illuminance sensor, a humidity sensor, a raindrop sensor, and the like. Detection information from the air temperature sensor, the illuminance sensor, and the humidity sensor is used for calculation and correction of electric power consumed by an air conditioner, a refrigerator, or the like as the electric load 25 used in the home 2. The raindrop sensor is used for estimating the operating state of a lighting device, a washing and drying machine, etc. as the electric load 25. The camera and the radar are used to detect a garage or a roofed parking lot provided in the home 2. The detection described above is performed when it is recognized that the vehicle is traveling or located outdoors. The GPS device is used to detect position information regarding the position the electric vehicle 1. The acceleration sensor is used to detect, for example, an earthquake, and when an earthquake is detected, charging is stopped.

<Information Acquiring Unit 130>

The information acquiring unit 130 includes, for example, a human-machine interface included in the electric vehicle 1, and includes an input unit. As the human-machine interface, a touch panel type display device, for example, is suitable. Such a human-machine interface can be used for various settings and adjustment of the traveling characteristics of the electric vehicle 1 and a comfort device and can also be used as a navigation system and an audio system. The user can provide information to the in-vehicle charging system 10 through the information acquiring unit 130 while riding on the electric vehicle 1 by operating the input unit of the information acquiring unit 130. The user operates the input unit of the information acquiring unit 130 to input information regarding the electric load 25 that consumes electric power to the in-vehicle charging system 10. The input information is stored in the storage unit of the integrated controller 110 described above.

Examples of the information regarding the electric load 25 include a contract capacity with an electric power company which is an upper limit value of the power capacity of the home 2, the availability of a plan that varies electricity rates based on a period of time according to the contract detail and a period of time and electricity rates according to the contract detail, a room layout and a structure of the home 2, home information including a home type such as a detached house and a collective housing, hot water supply, heat equipment, and the like, home appliance information regarding home appliances in the home 2, and the like. The home appliance information includes information necessary for estimating power consumption, such as a type and power consumption of the home appliance, a period of time in which the home appliance is used, and an operating time. Examples of the home appliances include AV home appliances such as a television, a radio, and an electronic musical instrument, home information appliances such as a personal computer, a video game machine, and a telephone, electrical household appliances such as a washing machine and a vacuum cleaner, electrical cooking appliances such as a refrigerator, a rice cooker, and a microwave oven, seasonal home appliances such as an air conditioner, an electric fan, an electric stove, and an electric blanket, and residential facilities such as a lighting device, a heat pump water heater, and a ventilation fan.

Note that, in the present embodiment, a touch panel type display device such as a navigation system provided in the electric vehicle 1 will be described as an example of the information acquiring unit 130, but the present invention is not limited thereto, and any device capable of acquiring information necessary for estimating the power consumption of the home 2 can be used. For example, the information acquiring unit 130 may be configured on a server to which a resident of the home 2 can be connected from any terminal via the Internet or the like. The electric vehicle 1 is provided with a device (for example, a display device) constituting a part of the information acquiring unit 130. When the user inputs the capacity of the ampere breaker 23 of the home 2, the home appliance information regarding home appliances in the home 2, and the like from the information acquiring unit 130 on the server, the vehicle refers to these pieces of information via a communication system (not illustrated) and acquires these pieces of information to the vehicle side.

<Integrated Controller 110>

Figure 2:
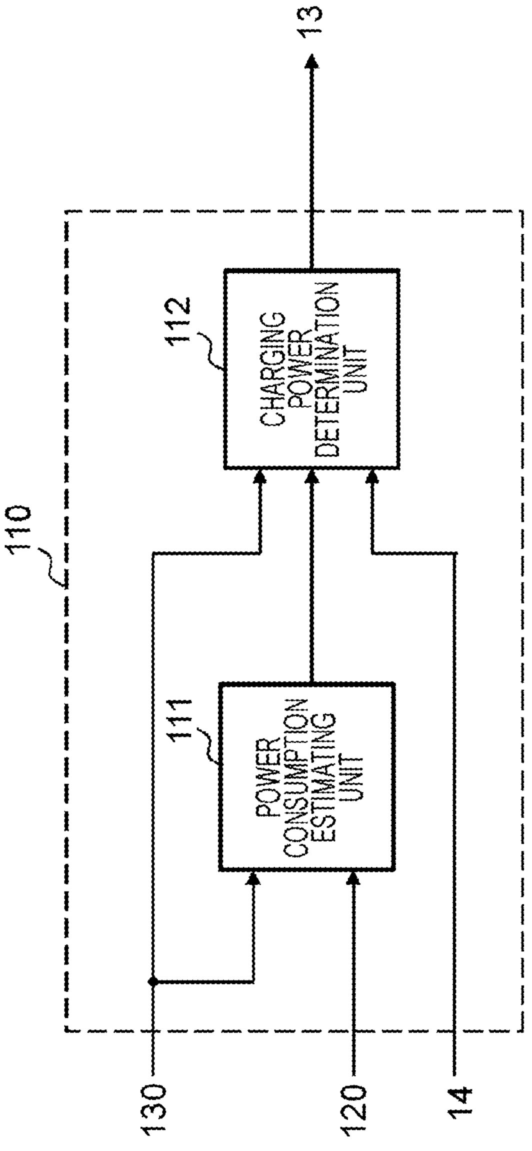
FIG. 2 is a functional block diagram of an integrated controller.

FIG. 2 is a functional block diagram of the integrated controller 110. The integrated controller 110 includes at least a power consumption estimating unit 111 and a charging power determination unit 112.

The power consumption estimating unit 111 receives external environment information detected by the external environment recognition unit 120 and information regarding the electric load 25 acquired by the information acquiring unit 130. The power consumption estimating unit 111 generates an operation pattern for each home appliance based on these pieces of input information, and estimates the power consumption of the home 2. Details of the estimation processing will be described later.

The charging power determination unit 112 receives the information regarding the electric load 25 acquired by the information acquiring unit 130, battery information (the state of charge or the temperature of the battery 11) acquired by the battery sensor 14, and a power consumption forecast (also referred to as a power consumption estimation value) of the home 2 estimated by the power consumption estimating unit 111. The charging power determination unit 112 sets, from the acquired information regarding the electric power contract of the home 2, upper-limit electric power at which the ampere breaker 23 interrupts the current (a state in which the breaker is thrown). Furthermore, the charging power determination unit 112 generates a charging plan such that the sum of the power consumption forecast of the home 2 and electric power for charging the battery 11 does not become equal to or more than the upper-limit electric power on the basis of the power consumption forecast of the home 2 estimated by the power consumption estimating unit 111 and the battery information from the battery sensor 14.

For example, the charging plan is provided as a form of a table in which the time and the upper limit value (hereinafter, referred to as upper-limit charging power) of electric power usable for charging the battery 11 are set. The generated charging plan is output to the charger controller 13. The charger controller 13 charges the battery 11 with electric power equal to or less than the upper-limit charging power according to the charging plan.

<Estimation of Power Consumed in Home 2 by Power Consumption Estimating Unit 111>

Figure 3:
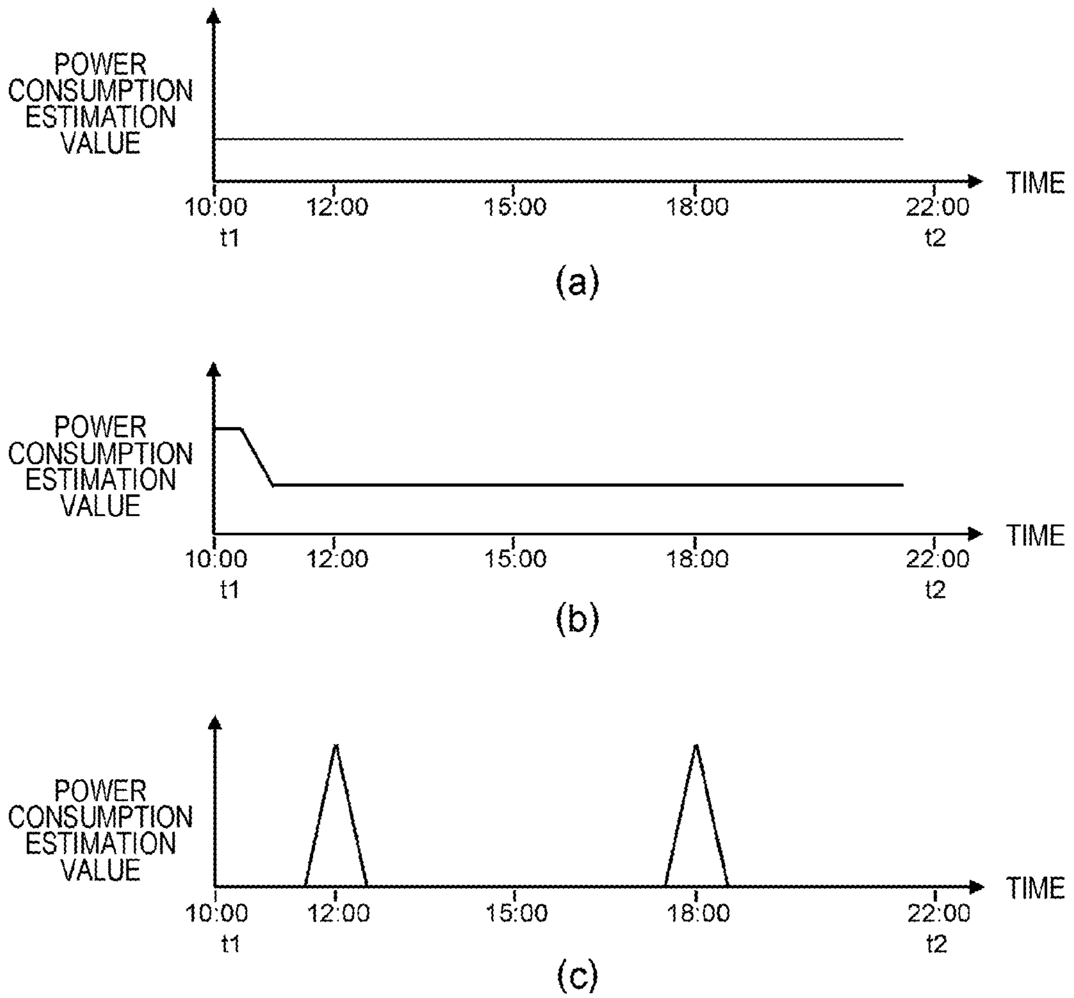
FIG. 3 is a diagram for describing estimation of power consumption by a power consumption estimating unit.

FIG. 3 is a diagram for describing estimation of power consumption by the power consumption estimating unit 111. The estimation of the power consumption indicates predicting a transition of the power consumption in the home 2 from a time t1 at which the electric vehicle 1 starts charging to a time t2 at which the charging of the battery 11 ends. The estimation result is generated as a power consumption profile map (or table) plotted with a horizontal axis representing time and a vertical axis representing electric power. The example illustrated in FIG. 3 illustrates a case where the electric vehicle 1 comes home at 10:00 (time t1), and the charging is started since then and ends at 22:00 (time t2). FIG. 3 illustrates a case where the charging is ended until 22:00, but there is no problem performing prediction for any time after 22:00. For example, the time to perform prediction may be determined regardless of the time to complete charging, such as 24 hours ahead or 48 hours ahead. Performing the prediction over the time at which the charging ends provides the following benefit. Specifically, even in a case where, for example, the charging of the battery 11 of the electric vehicle 1 has not been completed as scheduled, it is possible to determine whether or not the charging has exceeded the contract power of the home 2 even if the charging continues, and thus, it is possible to prevent the home 2 from having a power failure.

The power consumption estimating unit 111 generates a power consumption forecast for each home appliance as illustrated in FIGS. 3(*a*), 3(*b*), and 3(*c*) based on the information about the home appliances used in the home 2 acquired by the information acquiring unit 130. At that time, the power consumption estimating unit 111 classifies the home appliances into categories according to the usage mode, power consumption, etc., estimates the power consumption corresponding to each category, and generates the power consumption forecast.

FIG. 3(*a*) is an example of a power consumption forecast of a home appliance such as an AV home appliance or a home information appliance, which is assumed to be generally in operation while the user is in the home 2. Such a home appliance consumes almost constant power regardless of environmental factors such as temperature, and thus reflects the power consumption value input by the user. For example, in a period of time in which the resident of the home 2 seems to be sleeping, the power consumption may be set to 0, or the sleeping time of the resident may be acquired and the acquired time is set adjustable. In addition, a designer may set in advance such that a value corresponding to 1/10 of standby power is applied in a period of time between 0:00 and 5:00.

FIG. 3(*b*) illustrates an example of the power consumption forecast of the home appliance in which the power consumption varies depending on the outdoor temperature, humidity, and the like, and illustrates the power consumption forecast of an air conditioner. The efficiency of a device such as an air conditioner or a refrigerator that operates based on a heat pump cycle as an operating principle changes depending on a temperature setting condition or the temperature of an environment around the place where the device is installed. Therefore, it is preferable to correct, as appropriate, and estimate the power consumption of the air conditioner or the refrigerator on the basis of, for example, the measurement results of the air temperature and the solar radiation intensity by the air temperature sensor and the illuminance sensor as the external environment recognition unit 120. The air conditioner consumes a large amount of electric power after starting up, and the electric power transitions such that the power consumption decreases as the temperature of a room that is air-conditioned approaches a set temperature.

FIG. 3(*b*) illustrates an example in which the air conditioner is started from the time t1 at which charging is started. Here, the power consumption forecast is generated assuming that the air conditioner consumes electric power corresponding to the rated power consumption immediately after being activated, and thereafter, shifts to a steady operation and consumes constant electric power depending on the outside air temperature. For example, it is assumed that it takes one hour to shift to the power consumption during the steady operation after the air conditioner operates with rated power after being activated. For the power consumption during the steady operation, the power consumption value is set by referring to a power consumption map during the steady operation based on the air temperature and illuminance around the home 2 detected by the external environment recognition unit 120.

Examples of a method for setting the power consumption value during the steady operation include a method described in Non-Patent Literature (Tsuyoshi Ueno, Hiroyuki Kitahara, Development of Heat Source Characteristic Model of Room Air Conditioner, Report of Central Research Institute of Electric Power Industry, Comprehensive Report, R09 (2015), https://criepi.denken.or.jp/hokokusho/pb/reportDetail?reportNoUkCode=R09) (see 2022, 8, 18). In addition, the power consumption of the air conditioner may be calculated from home information about the home 2 acquired by the information acquiring unit 130 by a technique as described in Non-Patent Literature (National Research and Development Institute; Technical information on evaluation of energy consumption performance in accordance with the 2016 Energy Saving Standards (houses), https://www.kenken.go.jp/becc/documents/house/4-3_210401_v07.pdf) and (see 2022, 8, 18).

FIG. 3(*c*) illustrates a power consumption forecast of a home appliance that generates power consumption depending on a period of time and a home appliance that generates power consumption depending on weather, and illustrates a power consumption forecast of an IH heater that is an electrical cooking appliance as an example. Examples of home appliances that generate power consumption depending on a period of time include electrical cooking appliances, electrical household appliances, and lighting devices. Examples of home appliances that generate power consumption depending on weather include lighting devices and washing and drying machines.

In the case of a home appliance that generates power consumption depending on a period of time, the information acquiring unit 130 acquires the power consumption value and the period of time in which the home appliance is mainly used, and reflects the power consumption value and the period of time in the plan. As the period of time, a day is divided at an interval of an hour, 30 minutes, or three hours, and the user is allowed to select in which period of time he/she uses the home appliance. In the case of the IH heater (electrical cooking appliance) illustrated in FIG. 3(*c*), a demand for electric power consumption is generated around the time when the user of the home 2 eats a meal, and thus, a plan is generated on the basis of the time when the user eats a meal. Regarding a device that is activated by a timer (water heater), the operating time thereof is acquired from the user or the device.

In the case of a home appliance that generates power consumption depending on weather, the occurrence of power consumption is estimated on the basis of detection information from the raindrop sensor or the illuminance sensor as the external environment recognition unit 120. For example, for the washing and drying machine, a power consumption forecast is planned, assuming that a power consumption occurs when rainfall is detected by the raindrop sensor and information indicating that the user uses the washing and drying machine in rainy weather is acquired.

In the case of a lighting device that generates power consumption depending on a period of time and the weather, the magnitude of the power consumption is predicted by obtaining the number of lighting devices corresponding to the room layout and the number of rooms from the home information acquired by the information acquiring unit 130. The power consumption estimating unit 111 generates an operation prediction from the period of time after sunset or information regarding the surrounding illuminance obtained from the illuminance sensor as the external environment recognition unit 120, and predicts the power consumption forecast on the basis of the operation prediction. For example, in a case where it is assumed that brightness is not sufficient even before sunset such as in rainy weather, an operation prediction assuming that a lighting device is used is generated. Furthermore, the period of time in which the lighting device is used may be set on the basis of the sunset the previous day or sunset in the past one week detected by the external environment recognition unit 120.

Figure 4:
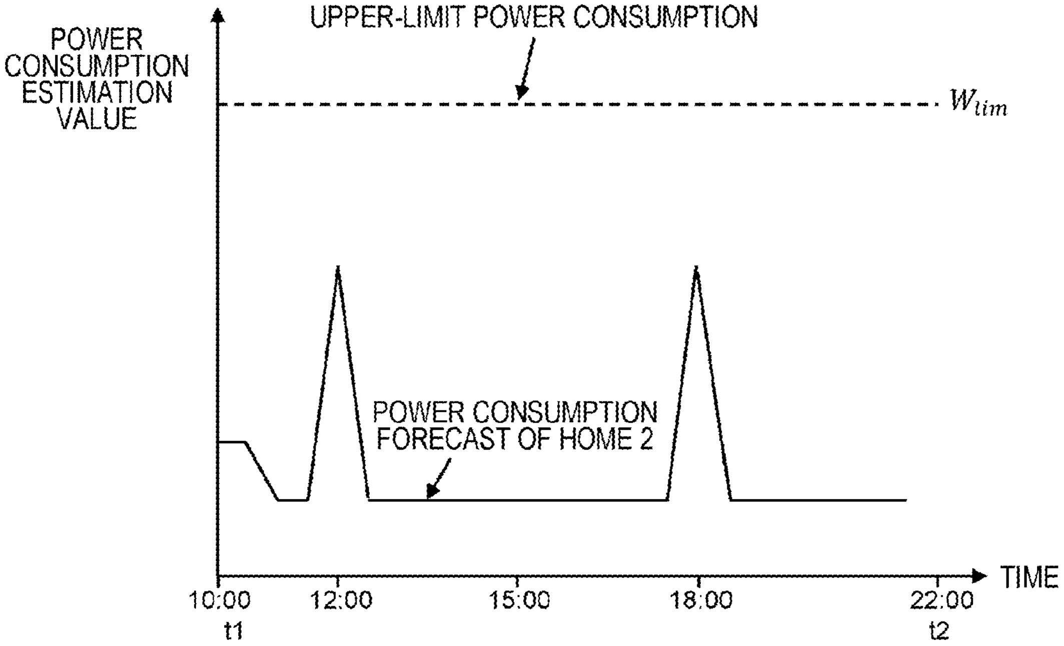
FIG. 4 is an example of a power consumption forecast of a home.

FIG. 4 is an example of a power consumption forecast of the home 2 obtained by adding the power consumption of the home appliances illustrated in FIGS. 3(*a*), 3(*b*), and 3(*c*). In FIG. 4, a line indicated by a solid line indicates a power consumption forecast, and a line indicated by a broken line indicates an upper-limit power consumption at which the ampere breaker 23 operates. Obviously, this is merely the power consumption forecast predicted in the home 2, so that the actual power consumption does not necessarily coincide with the predicted value illustrated in FIG. 4. FIGS. 3(*a*), 3(*b*), and 3(*c*) illustrate the cases using a television, a lighting device, an air conditioner, and an IH heater as examples, but it is obvious that there may be other home appliances used in the home 2. Regarding other home appliances and electric power loads to be used, prediction suitable for the use mode thereof is performed, and the power consumption is predicted in a similar manner.

For home appliances and the like used in the home 2, the power consumption that fluctuates due to the mode of use and the influence from the external environment is different as described above. An operation pattern is set in advance for not only the lighting device, television, air conditioner, and IH heater described above but also home appliances and the like that can be used in the home 2, and the power consumption value is corrected using information provided from the user, whereby a power consumption pattern can be set for each home appliance. For the IH heater and the like, a period of time in which the resident of the home 2 generally has a meal is collected as the home appliance information described above.

<Generation of Charging Plan by Charging Power Determination Unit 112>

Figure 5:
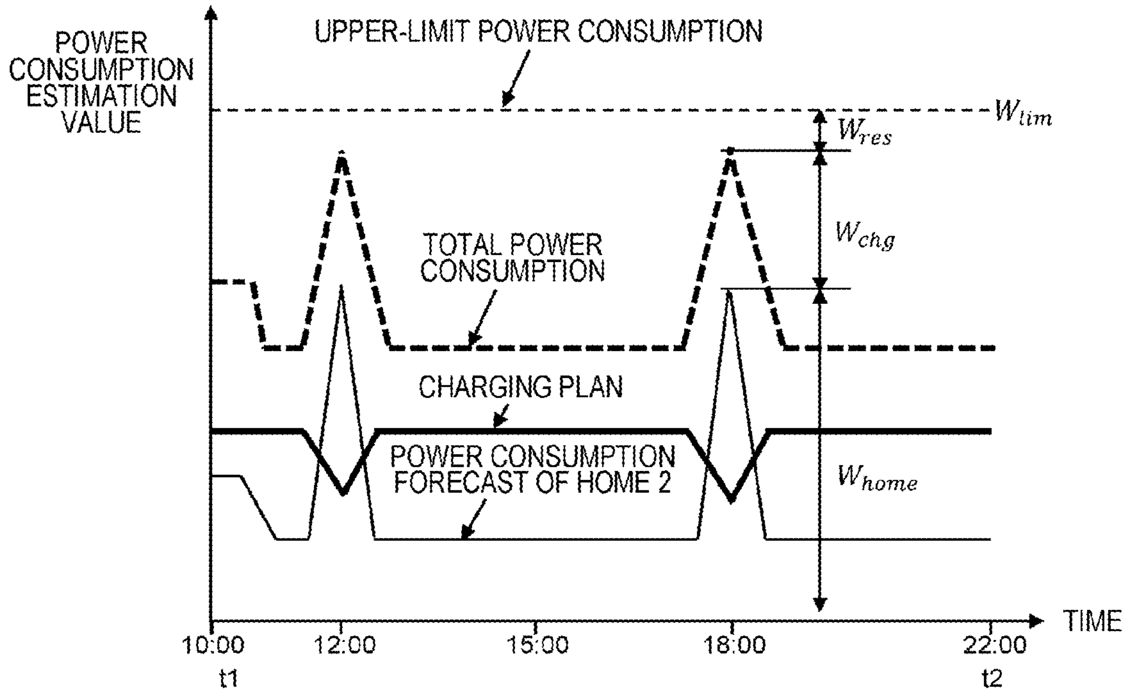
FIG. 5 is a diagram for describing details of generating a charging plan.

FIG. 5 is a diagram for describing details of generating the charging plan by the charging power determination unit 112. In FIG. 5, a broken line indicating the upper-limit power consumption and a solid line indicating the power consumption forecast in the home 2 are the same as the broken line indicating the upper-limit power consumption and the solid line indicating the power consumption forecast in the home 2 illustrated in FIG. 4. The charging power determination unit 112 plans electric power that can be used by the in-vehicle charger 12 to charge the battery 11 on the basis of the power consumption forecast in the home 2 estimated by the power consumption estimating unit 111 and the upper-limit power consumption in the home 2 acquired by the information acquiring unit 130.

In FIG. 5, a thick solid line indicates the charging plan for the battery 11 by the in-vehicle charger 12, and a thick broken line indicates the total power consumption obtained by adding a power consumption forecast Whome in the home 2 and electric power Wchg of the charging plan for the battery 11. Here, reserve power Wres is set for the total power consumption. The reserve power Wres may be set to a value corresponding to 5% or 10% of the capacity of the ampere breaker 23 in the home 2 as a predetermined value, or may be set to 0.

Then, the electric power Wchg of the charging plan is set such that the sum of the power consumption forecast Whome of the home 2, the electric power Wchg of the charging plan, and the reserve power Wres is lower than the upper-limit power consumption Wlim at each time as expressed by the following Expression (1).

$$Wlim(t) > Whome(t) + Wres(t) + Wchg(t) \quad (1)$$

In Expression (1), t represents any time in the plan. The charging power is planned to satisfy the above Expression (1) from the time t1 at which the charging plan is generated to the time t2, whereby it is possible to prevent the occurrence of a power failure, due to the operation of the ampere breaker 23, caused by the power consumption of the home 2 exceeding the contract electric power (upper-limit power consumption) during the charging of the battery 11.

In addition, the electric power Wchg is electric power that can be used by the in-vehicle charger 12, but is not necessarily used only for charging the battery 11. For example, it is assumed that, in order to set the temperature in the vehicle interior to an appropriate temperature by air conditioning before getting on the electric vehicle 1, the user operates an air conditioner of the electric vehicle 1 while the electric vehicle 1 receives the supply of electric power from the home 2 through the charging cable 27. Even in such a case, some measures should be taken to prevent the occurrence of a power failure in the home 2. Therefore, the electric power Wchg of the charging plan may include not only electric power for charging the battery but also electric power for air-conditioning the electric vehicle 1.

As described above, the reserve power Wres is set to a value corresponding to 5% or 10% of the capacity of the ampere breaker 23 of the home 2 as the predetermined value, but may be set from the weather condition around the home detected by the external environment recognition unit 120. For example, in a case where the raindrop sensor as the external environment recognition unit 120 predicts that the possibility of rainfall is high, the reserve power Wres is corrected to be increased. As a result, it is possible to avoid a situation in which the ampere breaker 23 is operated to cause a power failure due to an increase in the power consumption of the home 2 because of the user using a device such as a washing and drying machine or a dryer that is likely to be used when it rains.

On the other hand, when a large value, for example, a value exceeding 30% of the capacity of the ampere breaker 23 is set to the reserve power Wres, electric power that can be used by the in-vehicle charger 12 decreases, so that the time for charging the battery 11 may be excessively long. Therefore, it is not preferable to set an excessively large value to the reserve power Wres.

Although the upper-limit power consumption Wlim has been described above as the capacity at which the ampere breaker 23 operates, the upper-limit power consumption Wlim is not limited thereto. For example, the user may use a preset upper-limit power consumption in order to save electricity rates. In addition, a target power value is set when a wholesale electric power company that supplies electric power of the power system 21 performs demand response in response to a request to refrain from using electric power in order to stabilize a regional electric power supply. In such a case, the target power value may be set to the upper-limit power consumption Wlim. The target power value is acquired by, for example, receiving information distribution from a wholesale electric power company that supplies electric power of the power system 21.

Note that the charging plan may be generated by the following method instead of the method described above. First, it is based on the premise that the power consumption forecast of the home 2 by the power consumption estimating unit 111 and the upper limit value (upper-limit power consumption) of electric power at which the ampere breaker 23 operates are obtained. Based on this premise, a problem for maximizing a power margin (="upper-limit power consumption"−{"power consumption forecast of home 2"+"charging power of battery 11" }) and an amount of charging power is formulated as the following Expression (2) and optimized as a linear programming problem, whereby a charging plan that can reduce the charging time while avoiding a power failure can be obtained. In Expression (2), the first term on the right side is the power margin, the second term is the amount of charging power, k is time, and T is the length of a period after the time t at which the plan is generated. The parameters α and β that represent weighting factors are for adjusting which of the size of the margin and the amount of power to be charged is to be prioritized. $P^{Limit}$ in the first term is the upper-limit electric power, and W with tilde (~) is the power consumption forecast of the home 2. $b_j^v$ in the second term is the charging power of the battery 11. N is the number of vehicles corresponding to the electric vehicle 1 to be charged in the home 2, and j is a number corresponding to each vehicle.

[Mathematical formula 1]

$$Z = \alpha\sum_{k=t}^{t+T} P^{Limit}(k) - \tilde{W}(k \mid t) + \beta\sum_{k=t}^{t+T}\sum_{j=1}^{N} b_j^v(k \mid t) \quad \text{(Expression 2)}$$

Figure 6:
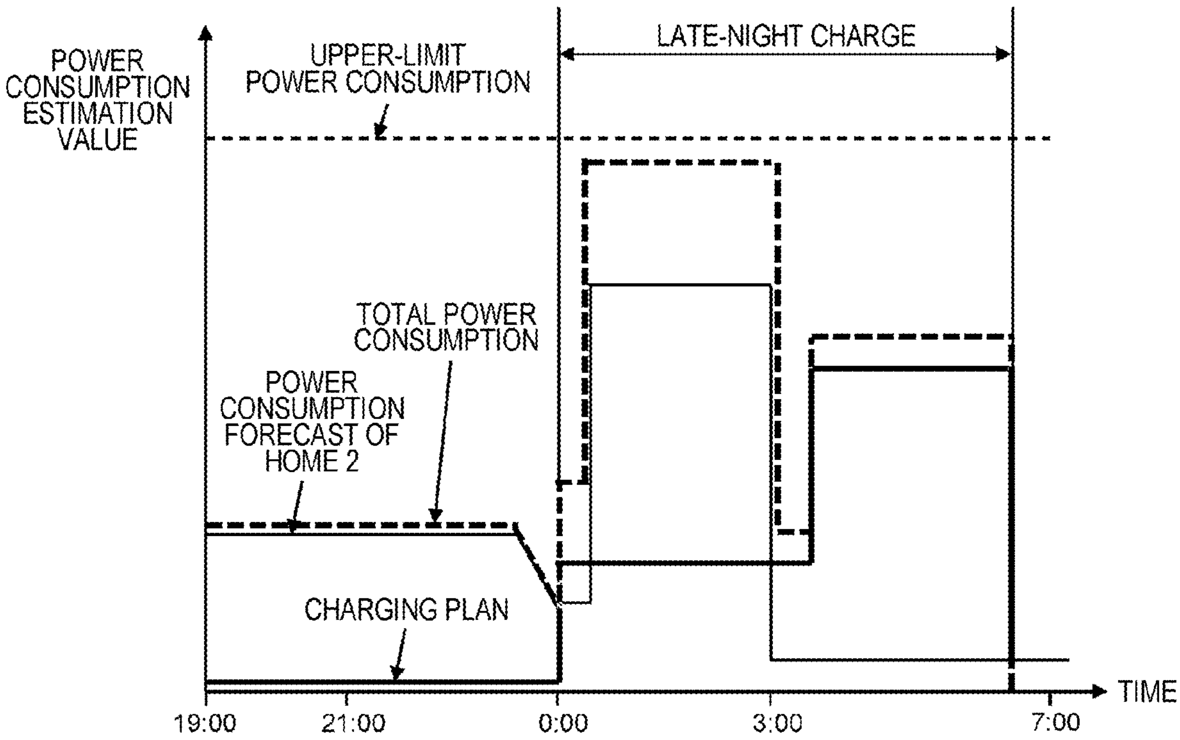
FIG. 6 is a diagram illustrating an example of a charging plan.

FIG. 6 is a diagram illustrating an example of a charging plan in a case where a charging contract in which the electricity rate of the home 2 fluctuates according to a period of time is applied. In FIG. 6, a thin broken line indicates the upper-limit power consumption, a thin solid line indicates a power consumption forecast of the home 2, a thick solid line indicates a charging plan for the battery 11, and a thick broken line indicates the total power consumption obtained by adding the power consumption forecast of the home 2 and electric power in the charging plan as in FIG. 5. In the period of time indicated by an arrow, a late-night charge plan that offers lower electricity rates is applied.

In a case where the electricity rate of the home 2 fluctuates according to a period of time as illustrated in FIG. 6, the charging power determination unit 112 may generate a plan for reducing the electricity rate for electric power used for charging. Such information regarding the electricity rate may be input by the user through the information acquiring unit 130, or may be provided by a method for sequentially distributing the information to the information acquiring unit 130 by a wholesale electric power company. The charging power determination unit 112 generates a charging plan so that an amount of charging power in the period of time to which the late-night charge plan is applied increases. In FIG. 6, the charging plan is generated such that the area of a region surrounded by the horizontal axis and the thick solid line indicated as the charging plan increases.

Figure 7:
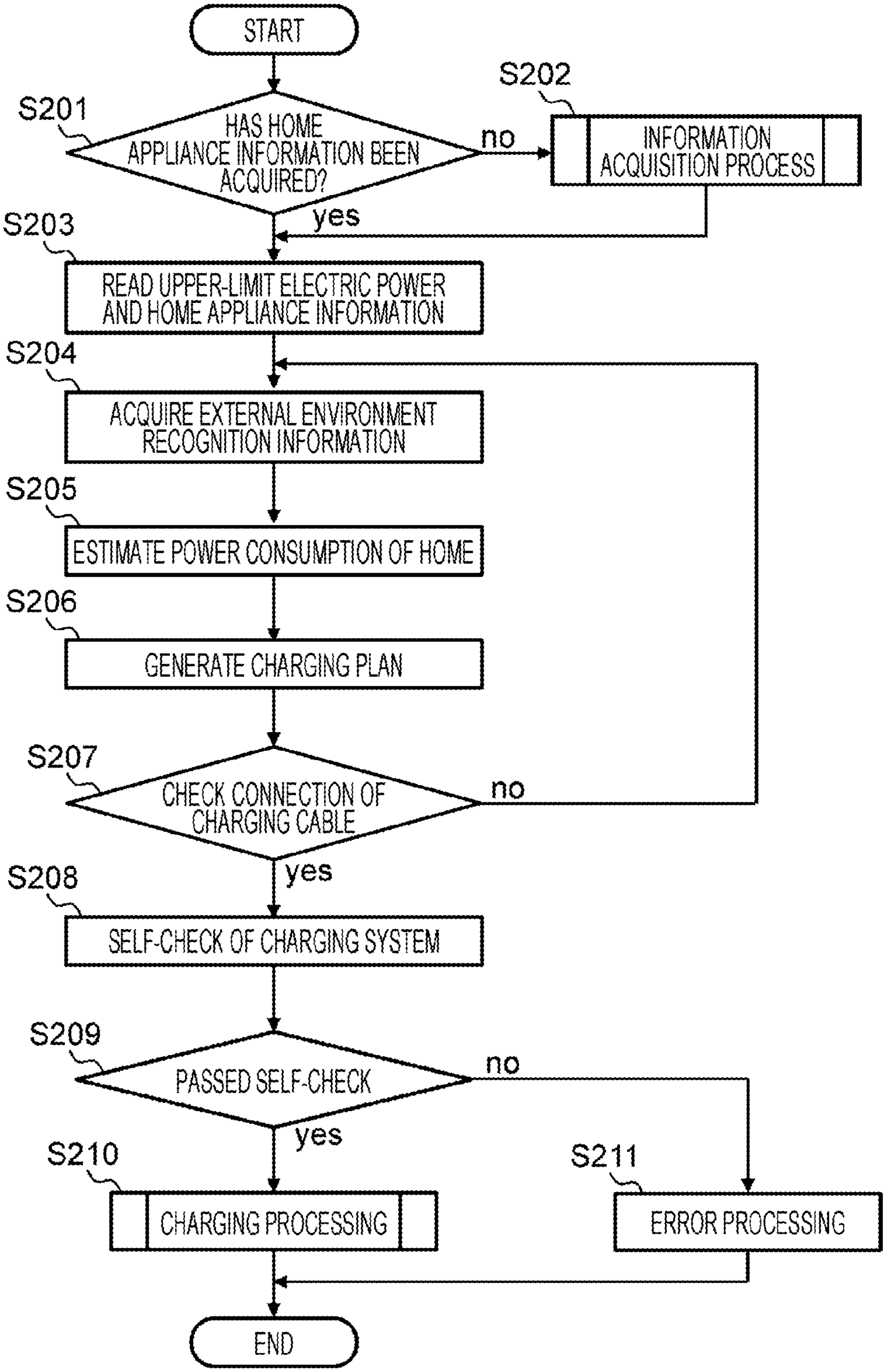
FIG. 7 is a flowchart illustrating a series of processes performed by an in-vehicle charging system.

FIG. 7 is a flowchart illustrating a series of processes performed by the in-vehicle charging system 10 described above, and the processes are executed by the integrated controller 110. Note that the processing of the flowchart illustrated in FIG. 7 is started, for example, when the user sets the shift lever of the electric vehicle 1 to park or turns off the ignition. Alternatively, the processing may be started by a start instruction from the user.

In step S201, the integrated controller 110 determines whether or not the contract power and the home appliance information necessary for estimating the power consumption of the home 2 have been acquired by the information acquiring unit 130. When it is determined in step S201 that the information has not been acquired (no), the processing proceeds to step S202 to execute a subroutine for acquiring the information, and then proceeds to step S203. The detailed process of step S202 will be described later. On the other hand, when it is determined in step S201 that the information has been acquired (yes), the processing proceeds to step S203. Note that, in a case where a power failure occurs at the time of previous charging, it is conceivable that a new home appliance is added to the home 2, and thus, it is possible to ask the user whether there is no update in the home appliance information in step S201.

In step S203, the integrated controller 110 reads the home appliance information that has already been acquired or is acquired in step S202. In step S204, the integrated controller 110 reads the external environment information detected by the external environment recognition unit 120. In step S205, the power consumption estimating unit 111 of the integrated controller 110 estimates a power consumption forecast of the home 2 based on the home appliance information and the external environment information that have been read. In step S206, the charging power determination unit 112 of the integrated controller 110 generates a charging plan for the battery 11 on the basis the power consumption forecast of the home 2 and the upper-limit power consumption of the home 2 obtained in step S205.

Note that the power consumption forecast and the charging plan may be displayed on a display device included in the human-machine interface. The user can check information regarding charging while sitting in the driver's seat before getting out of the electric vehicle 1.

In step S207, the integrated controller 110 checks the connection state of the charging cable 27 on the basis of information from the control box included in the charging cable 27, and determines whether or not the battery 11 can be charged. When the charging cable 27 is not connected, the processing returns to step S204. In a case where the charging is possible, the processing proceeds to step S208 where a self-check of the charging system related to charging is performed. For example, a temperature, a voltage, and the like of the battery 11 are acquired, and it is confirmed whether or not the battery 11 can be charged. In step S209, it is determined whether or not the charging system has passed the self-check (whether or not charging is possible). In a case where it is determined that the charging system has passed in step S209, the processing proceeds to step S210 where the battery 11 is charged according to the charging plan generated in step S206. On the other hand, when it is determined that the charging system has not passed in step S209, the processing proceeds to step S211 to execute error processing such as error notification.

When the detection value of the acceleration sensor, which is one of the elements included in the external environment recognition unit 120, becomes equal to or greater than a predetermined acceleration while the battery 11 is being charged by the in-vehicle charger 12, the charging is stopped. When the acceleration sensor detects a periodic acceleration of a predetermined value or more, it is considered that an earthquake may have occurred. In addition, in a case where the acceleration becomes a predetermined value or more regardless of periodicity, there is a possibility that something has collided with the electric vehicle 1. By automatically stopping the charging when such acceleration is detected during battery charging, an occurrence of a secondary disaster such as a fire can be prevented.

Note that the reference of the seismic intensity may be changed by the user. For example, an earthquake measured a lower 5 occurs, the charging is temporarily stopped. When the acceleration is no longer detected and it is detected that the electric power supply is continued by the charging cable 27 after the charging is automatically stopped, the charging is resumed.

Figure 8:
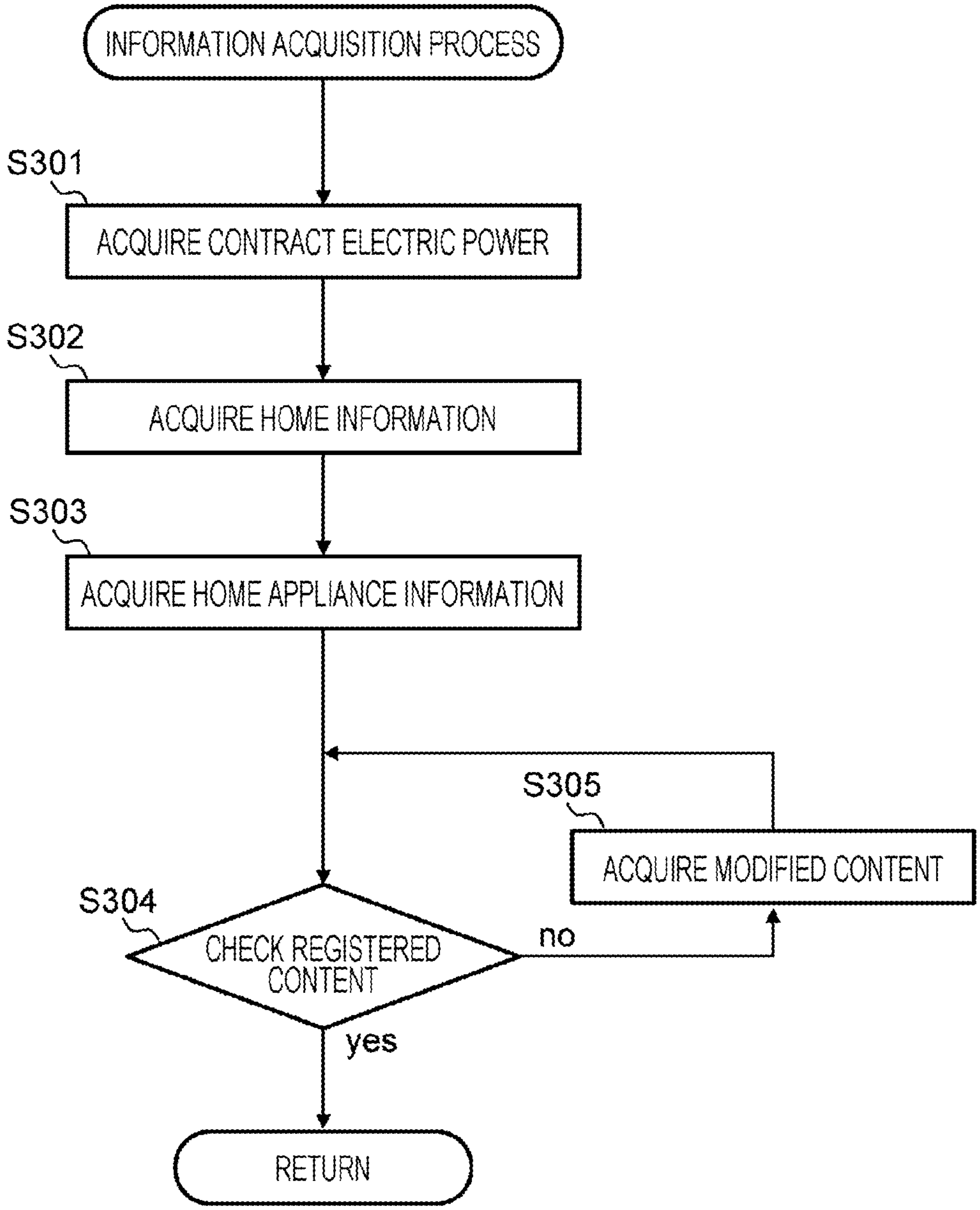
FIG. 8 is a flowchart illustrating detailed processing of an information acquisition process of step S202 illustrated in FIG. 7.

FIG. 8 is a flowchart illustrating the detailed processing of an information acquisition process of step S202 illustrated in FIG. 7. Note that the home appliance in the home appliance information is not limited to a popular home appliance as long as it consumes electric power in the home 2 and consumes electric power measured by the electric power meter 22.

In step S301, the information acquiring unit 130 acquires the capacity contracted with the electric power company, which is the upper limit value of the power capacity of the home 2. In step S302, the layout and structure of the home 2, information indicating that the home 2 is a detached house or a collective housing, and information regarding hot water supply and heat equipment are acquired. In step S303, home appliance information of the home 2 is acquired. In step S304, the integrated controller 110 checks the content of the information acquired by the information acquiring unit 130. Then, if there is information that needs to be modified (in the case of no), the processing proceeds to step S305 to reacquire correct information.

As described above, in the first embodiment, the power consumption of the home 2 is estimated on the basis of the information acquired by the external environment recognition unit 120 and the information acquiring unit 130 mounted on the electric vehicle 1, and a charging plan for the battery 11 is determined on the basis of the estimated power consumption estimation value (power consumption forecast). Therefore, it is possible to estimate an amount of electric power consumed by the home 2 and generate a charging plan with the electric vehicle 1 alone without requiring a device for estimating the amount of power consumption and generating the charging plan in the home 2. As a result, optimal charging can be performed while avoiding the risk of the breaker of the home 2 being thrown.

Second Embodiment

Figure 9:
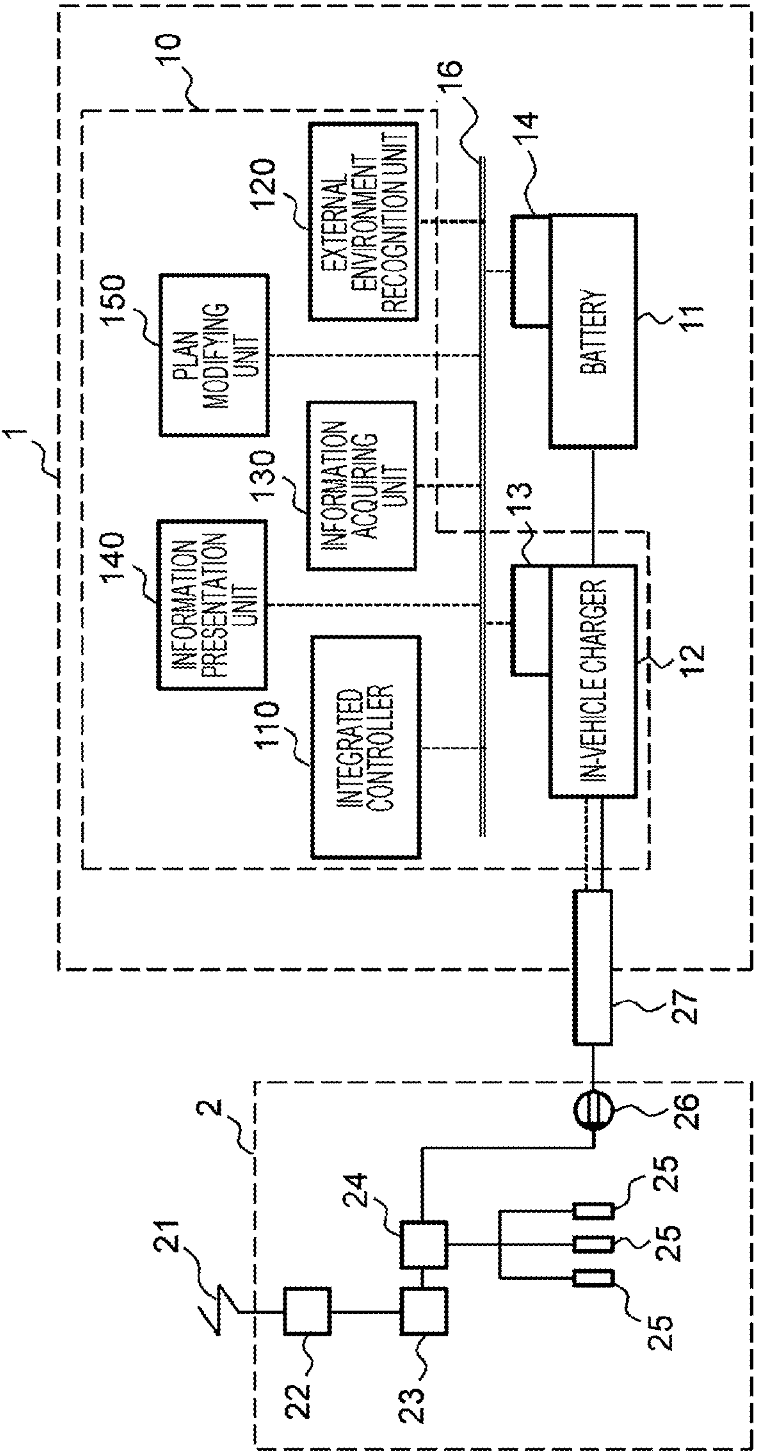
FIG. 9 is a block diagram for describing a second embodiment of the present invention.

FIG. 9 is a block diagram for describing a second embodiment of the present invention, and illustrates device configurations of an electric vehicle 1 and a home 2 as in FIG. 1. An in-vehicle charging system 10 illustrated in FIG. 9 further includes an information presentation unit 140 and a plan modifying unit 150 in addition to the configuration illustrated in FIG. 1.

<Information Presentation Unit 140>

The information presentation unit 140 presents, to the user, the power consumption forecast of the home 2 illustrated in FIG. 4, the charging plan for the battery 11 illustrated in FIG. 5, and the like. In addition, the information presentation unit 140 displays a situation of a power failure risk when charging is performed according to the charging plan, thereby alerting the user. For example, the information presentation unit 140 presents the time t2 in FIG. 5 as the scheduled time at which charging of the battery 11 is completed. In addition, as illustrated in FIG. 5, the information presentation unit 140 displays information indicating that there is a high risk of the ampere breaker 23 of the home 2 operating at around 12:00 and 18:00.

The user can correct the value of the reserve power Wres to be decreased by the plan modifying unit 150, and can correct the power consumption forecast of the home appliance by refraining from using electrical cooking appliance such as an IH heater in the period of time described above. With such a correction, it is possible to correct the upper-limit charging power upon charging the battery 11 to be increased. As a result, a plan for further shortening the charging time of the battery 11 can be generated, and the battery 11 can be charged while preventing the power failure of the home 2. The power consumption forecast and the charging plan are presented to the user by the information presentation unit 140 as described above, whereby it is possible to prompt the user to shorten the charging time while avoiding the power failure.

Note that the plan modifying unit 150 may be configured as a human-machine interface having a function thereof, like the information presentation unit 140, etc., or may be configured on a server as in the information acquiring unit 130 described above.

Figure 10:
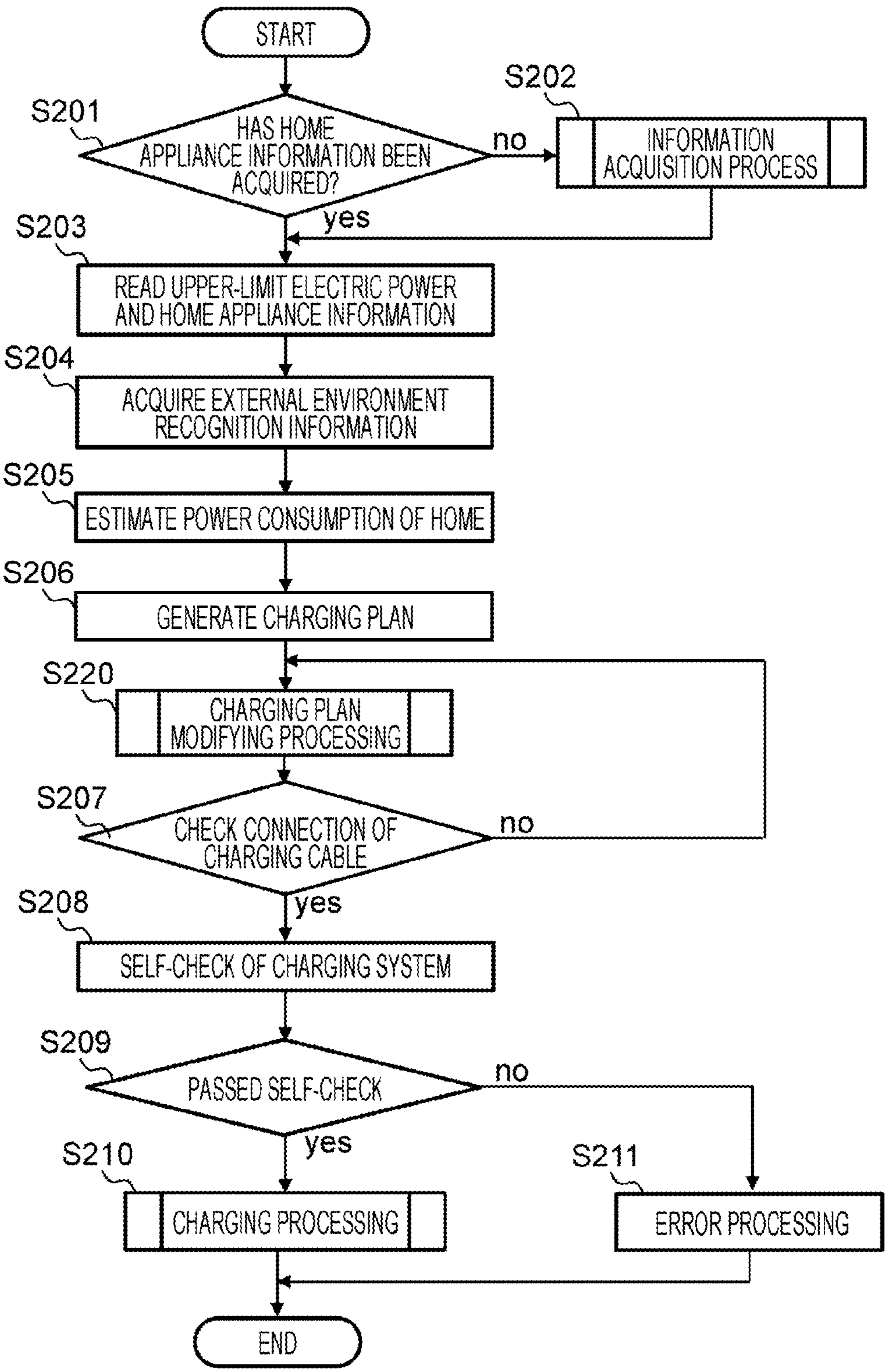
FIG. 10 is a flowchart for describing an operation of an in-vehicle charging system according to the second embodiment.

FIG. 10 is a flowchart for describing an operation of the in-vehicle charging system 10 according to the second embodiment. The flowchart illustrated in FIG. 10 is changed such that step S220 is added to the flowchart illustrated in FIG. 7, and the processing proceeds to step S220 when it is determined in step S207 that a cable is not connected. The processes of the other steps are similar to the processes described with reference to FIG. 7, so that charging plan modifying processing of the added step S220 will be described below.

Figure 11:
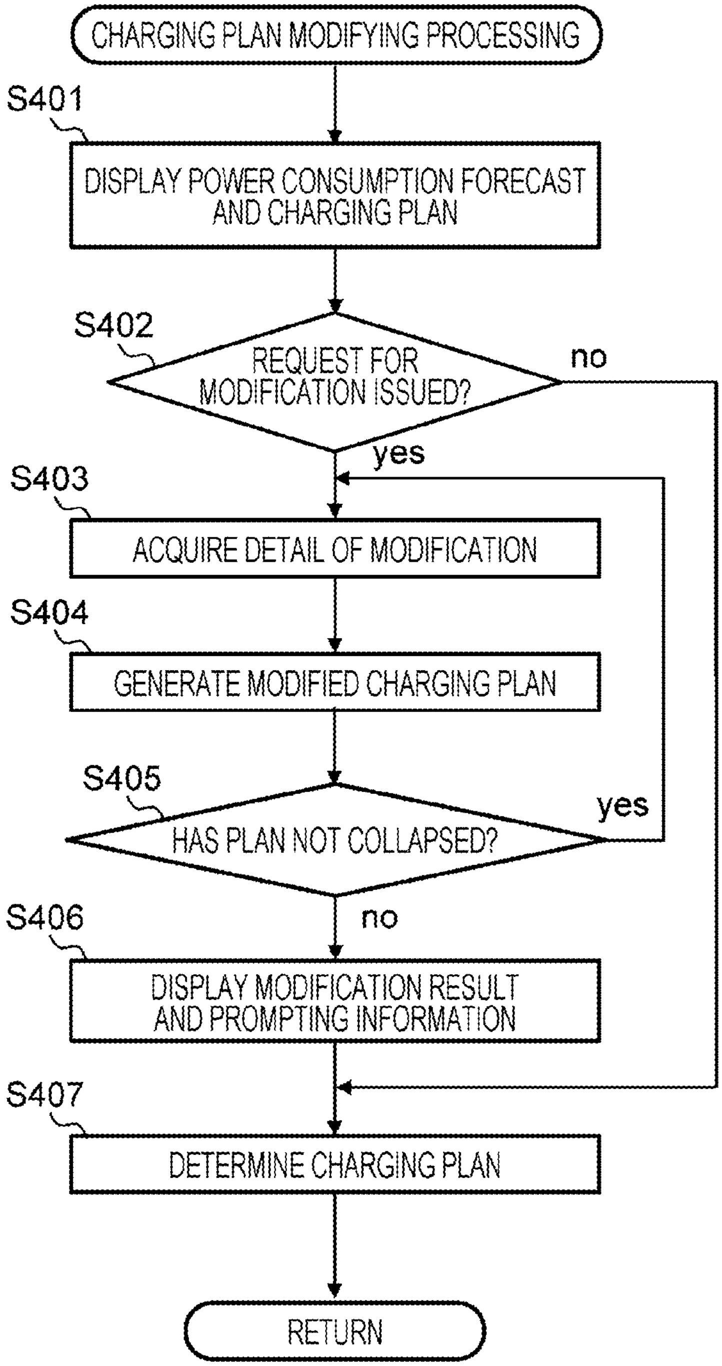
FIG. 11 is a flowchart illustrating an example of details of charging plan modifying processing illustrated in step S220 in FIG. 10.

FIG. 11 is a flowchart illustrating an example of the details of the charging plan modifying processing of step S220. A series of charging plan modifying processing is executed by the plan modifying unit 150. In step S401, a power consumption forecast and a charging plan are displayed on the information presentation unit 140.

Figure 12:
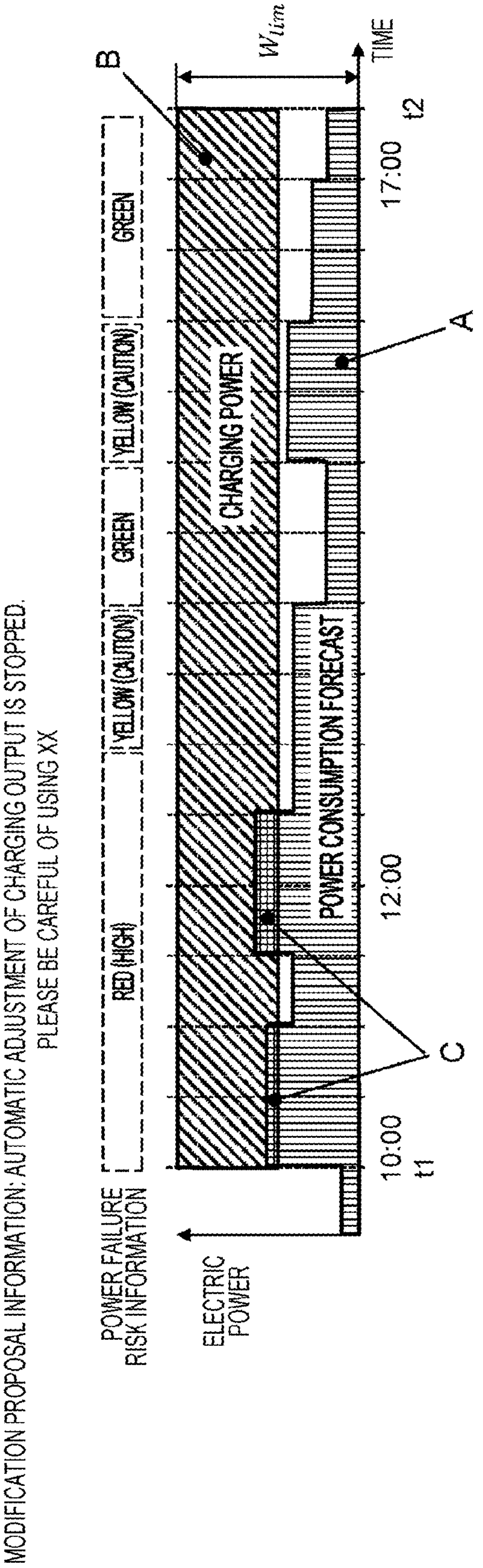
FIG. 12 is a diagram illustrating a display example of an information presentation unit.
Figure 13:
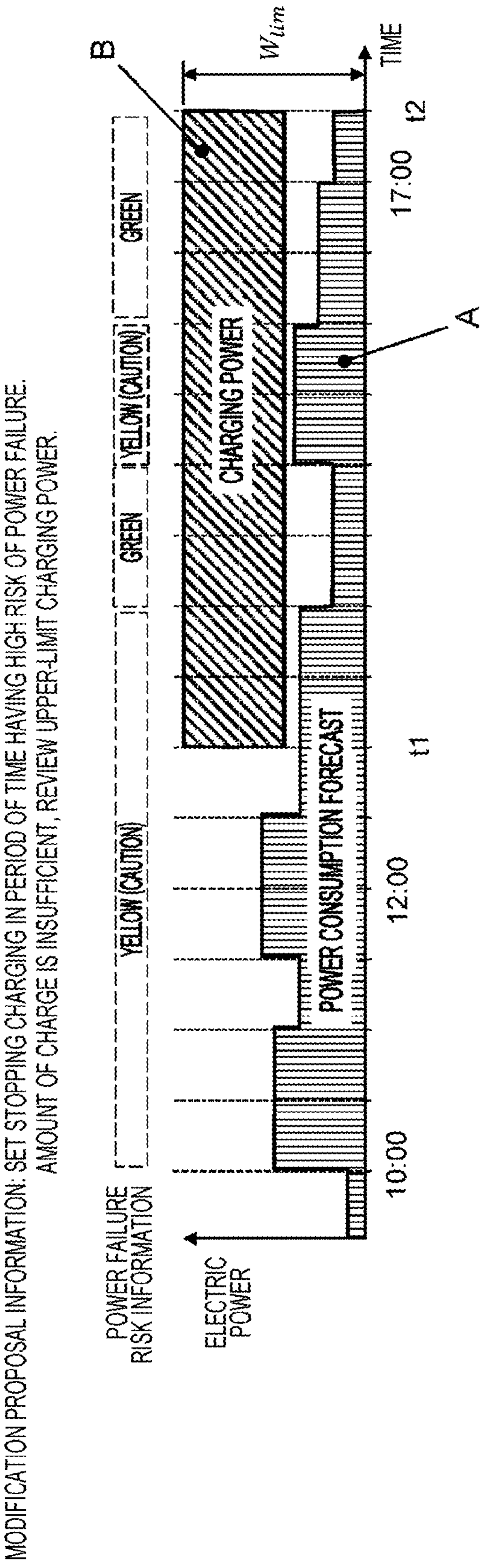
FIG. 13 is a diagram illustrating another display example of the information presentation unit.

FIGS. 12 and 13 illustrate display examples of a power consumption forecast (A) of the home 2 and charging power (B) based on the charging plan in the information presentation unit 140. The widths of regions A and B in the vertical direction in the drawings represent charging power Wchg and power consumption Whome of the home 2, respectively. Power failure risk information is displayed above the charging power (B). Further, advice related to the charging plan is displayed as modification proposal information above the power failure risk information.

FIG. 12 illustrates a case where the automatic adjustment of the charging power is stopped, and the charging power Wchg from the start time t1 to the end time t2 is set to a constant value. Therefore, a region C in which the region A and the region B overlap each other is generated in a period of time from 10:00 to 11:00 and a period of time from 11:30 to 12:30. The power failure risk is represented by color display. Specifically, a green color indicates a safety level, a yellow color indicates a caution level, and a red color indicates a high level of power failure risk. In the example illustrated in FIG. 12, the power failure risk in the period of time from 10:00 to 13:00 is displayed in red.

FIG. 13 illustrates a case where charging of the battery 11 is stopped in a period of time in which the power failure risk is high. In FIG. 12, the charging start time t1 is 10:00, but in FIG. 13, the start time t1 is set to 13:00. Therefore, the overlap of the region A and the region B is eliminated, but the charged power amount (remaining charge amount) of the battery 11 at the end time t2 is lower than that in the case of FIG. 12.

The user considers whether to review the charging plan by referring to the power consumption forecast, the charging plan, the power failure risk information, and the modification proposal information displayed on the information presentation unit 140. Then, the user operates the input unit of the information acquiring unit 130 to input an instruction to modify or not to modify the charging plan. For example, the user requests to modify the charging plan according to his/her wishes to end the charging earlier or reduce power consumption.

Returning to FIG. 11, in step S402, it is determined whether or not a request for modification is issued from the user. When the request for modification is issued, the processing proceeds to step S403, and when the request for modification is not issued, the processing proceeds to step S407. When the processing proceeds to step S407 without the request for modification, the charging plan is determined.

On the other hand, when the processing proceeds to step S403 due to the request for modification being issued, the detail of modification is acquired from the user. Specifically, a modification screen is displayed on the information presentation unit 140, and the user is allowed to input the detail of modification. The user modifies the charging end time, the reserve power Wres, the power consumption of the home appliance, the upper-limit charging power upon charging the battery 11, and the like. Note that, in a case where it is considered difficult for the user to sequentially and accurately grasp the power consumption of the home appliance, the power consumption forecast of the home 2 may be modified by selecting whether to use the home appliance included in the power consumption forecast.

In step S404, the plan modifying unit 150 generates a modified charging plan on the basis of the detail of modification in step S403. Note that the modified charging plan may be generated by the plan modifying unit 150, or the detail of modification in step S403 may be transmitted to the integrated controller 110 and the charging power determination unit 112 may generate the modified charging plan.

In step S405, the plan modifying unit 150 checks whether or not the content of the modified charging plan generated in step S404 has collapsed. Specifically, the plan modifying unit 150 determines whether or not the plan includes a time at which the upper-limit power consumption Wlim(t), the power consumption Whome(t) of the home 2, the power Wchg(t) used by the in-vehicle charger 12, and the surplus power Wres(t) satisfy the relationship indicated by the following Expression (3).

$$Wlim(t) < Whome(t) + Wchg(t) + Wres(t) \tag{3}$$

When it is determined in step S405 that the plane has collapsed, the processing returns to step S403 to display a modification screen prompting modification on the information presentation unit 140. The processes from step S403 to step S405 are repeated until a plan without collapse is created. Note that every time the modification in step S403 is input, the modified charging plan and power consumption forecast are displayed on the information presentation unit 140. Thus, the user can interactively modify the charging plan, whereby the user can easily grasp the power consumption forecast and the charging plan.

On the other hand, when it is determined in step S405 that the charging plan has not collapsed, the processing proceeds to step S406 to display the modified charging plan on the information presentation unit 140 and provide advice or the like for the modified charging plan to the user. Examples of the advice include information for further reducing the possibility of a power failure. Specific examples of the advice include displaying a home appliance that should not be used in a period of time in which the power consumption of the home 2 is high, giving a notification indicating that the charging end time is prolonged when the modified charging plan for reducing the upper limit value of the charging power is applied, and giving a notification indicating a forecast of the state of charge of the battery 11 at the time at which the electric vehicle 1 is to be started to be used the next day.

When the process of step S406 is completed, the processing proceeds to step S407 to determine the charging plan.

In the second embodiment described above, the power consumption forecast, the charging plan, the power failure risk information, and the like of the home 2 are presented to the information presentation unit 140, whereby the user can grasp the details of the charging plan and the like. As a result, the user can grasp a risk of power failure and a factor causing a situation in which the charging output does not reach the rated capacity, and thus, the user can consider reviewing the charging plan and the like. In addition, the plan modifying unit 150 for modifying the charging plan is provided, whereby the charging power can be adjusted by the user so that the charging time can be further shortened while avoiding the power failure. At that time, the charging information including the modified charging plan is presented to the information presentation unit 140, whereby it is possible to efficiently and effectively adjust the charging power.

Third Embodiment

Figure 14:
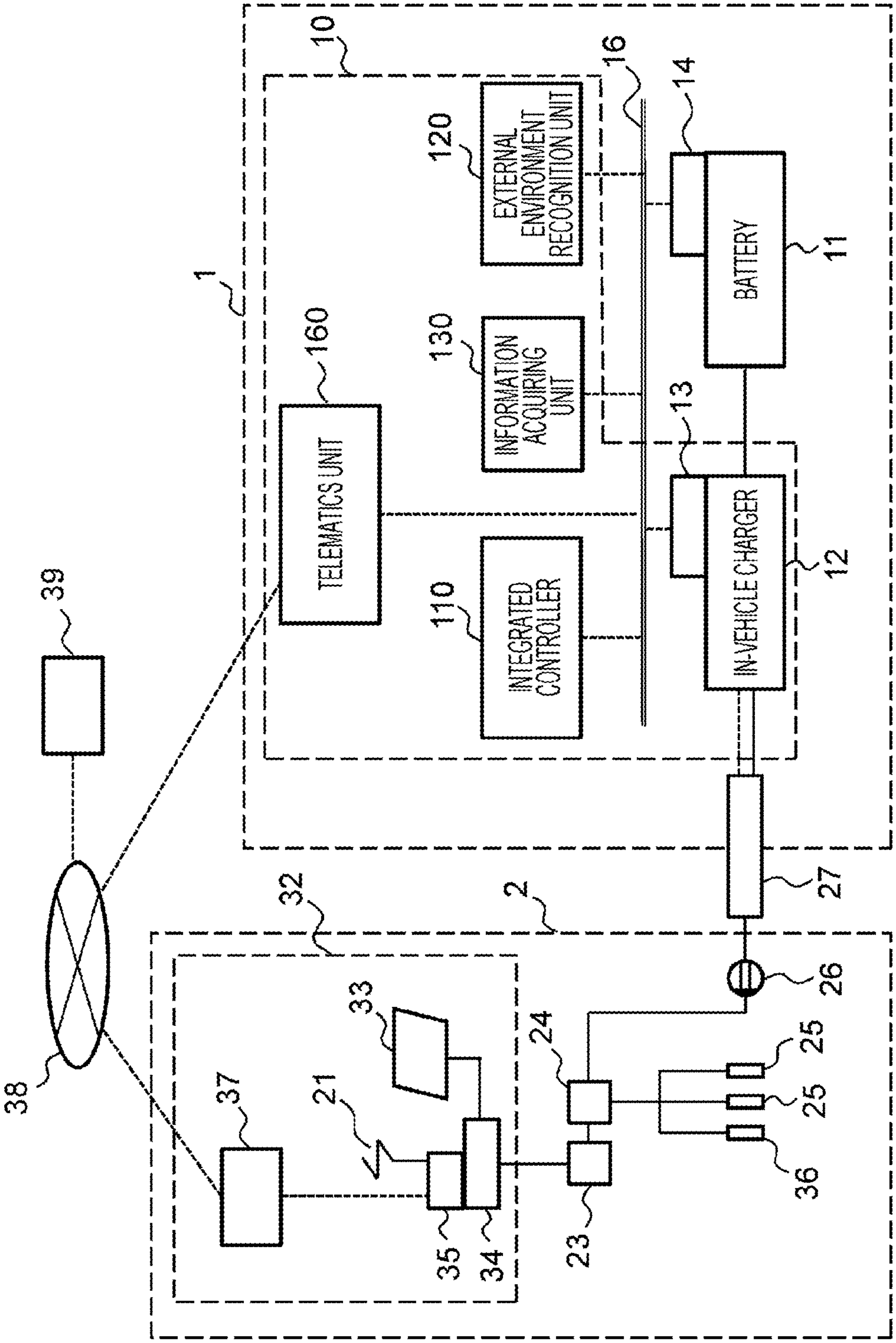
FIG. 14 is a block diagram for describing a third embodiment of the present invention.

FIG. 14 is a block diagram for describing a third embodiment of the present invention. The configuration illustrated in FIG. 14 includes, in addition to the configuration of the first embodiment illustrated in FIG. 1, an energy management system 32 in a home 2 and a telematics unit 160 in an in-vehicle charging system 10. The energy management system 32 includes a solar panel 33, a power conditioner 34, a smart meter 35, an Internet of Things (IOT) home appliance 36, and a HEMS controller 37.

The power conditioner 34 has a function of using power generated by the solar panel 33 in the home 2 or selling the power to the power system 21. The smart meter 35 measures power input into and output from the power system 21. The adjustment of the power consumption and the power activation of the IOT home appliance 36 can be controlled by the smart meter 35 and the energy management system 32. The HEMS controller 37 controls the power conditioner 34 and the IOT home appliance 36 by aggregating a power trading result by the smart meter 35 and the operation result of the IOT home appliance 36.

Further, the HEMS controller 37 is configured to be able to communicate with an aggregation server 39 via an Internet network 38. The aggregation server 39 holds a power consumption result and power trading information of the home 2 acquired through the HEMS controller 37 and performs statistical processing. The user can confirm these pieces of information held by the aggregation server 39 from any terminal (not illustrated). The in-vehicle charging system 10 refers to the power consumption result of the home 2 through the telematics unit 160 and the Internet network 38, and transmits a detection result of the external environment recognition unit 120 to the aggregation server 39. The aggregation server 39 associates the detection result (air temperature, illuminance, humidity, and the like) from the external environment recognition unit 120 with the power consumption result of the home 2, and holds the resultant as power consumption result information. The in-vehicle charging system 10 can acquire the power consumption result information from the aggregation server 39 by using the telematics unit 160 provided in the in-vehicle charging system 10.

When the power consumption of the home 2 is estimated, the power consumption result information under conditions similar to the air temperature, illuminance, and humidity detected by the external environment recognition unit 120 is read from the aggregation server 39. Then, a power consumption forecast of the home 2 is generated using the operation pattern of the home appliance included in the read power consumption result information. As described above, the past power consumption result in the home 2 is reflected in estimating the power consumption, whereby the accuracy of estimating the power consumption can be enhanced. As a result, the planning system of the charging plan is improved, and it is possible to prevent the occurrence of a power failure in the home 2 when the battery is charged. In addition, the accuracy of estimating the power consumption increases, whereby the surplus power Wres in the charging plan can be further reduced, and the charging time can be prevented from becoming excessively long.

In addition, in a case where the power consumption of the home 2 exceeds a value estimated by the power consumption estimating unit 111 during the charging according to the charging plan, the charger controller 13 may be instructed to reduce the output of the in-vehicle charger 12 to prevent a power failure. In a situation where the weather changes after the start of charging and heating is stopped contrary to expectation, the actual power consumption becomes smaller than the power consumption estimation value. Therefore, the output of the in-vehicle charger 12 may be increased to shorten the charging time.

First Modification

Figure 15:
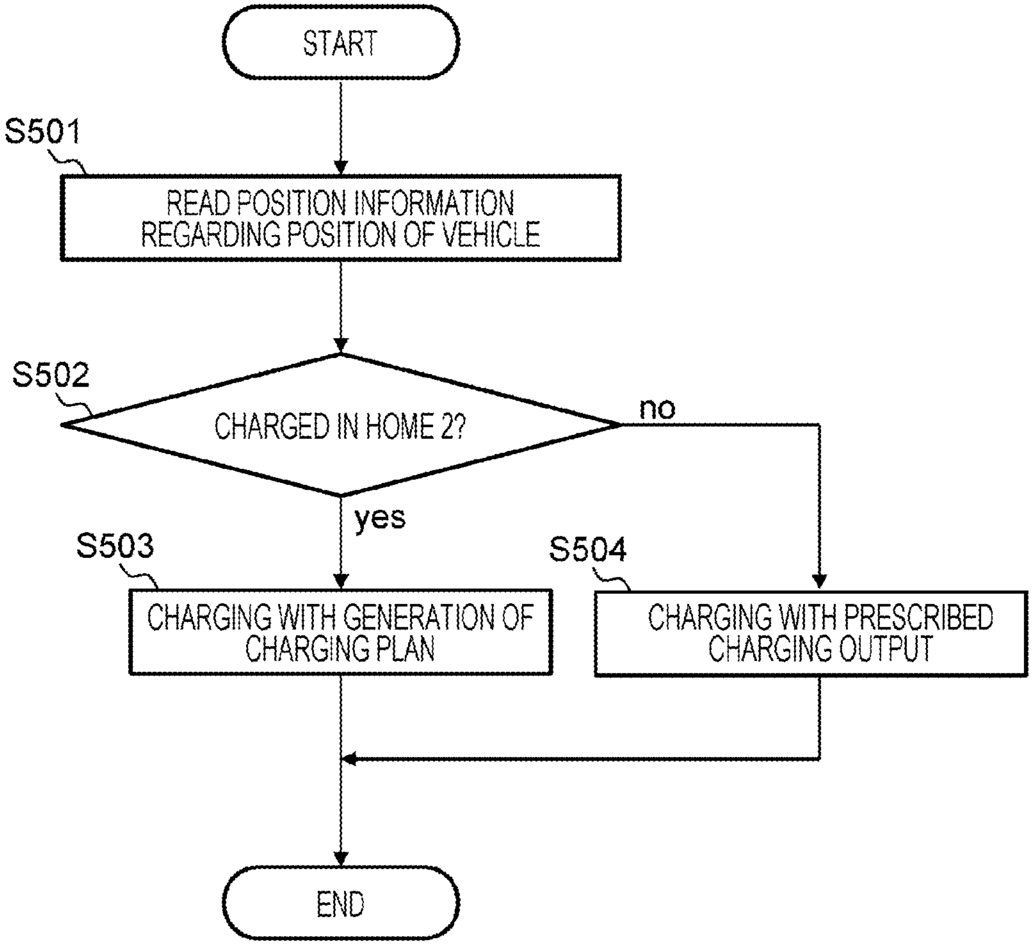
FIG. 15 is a flowchart for describing a first modification.

FIG. 15 is a flowchart for describing a first modification. In the first modification, the external environment recognition unit 120 includes a GPS device and acquires position information regarding the position of the electric vehicle 1. The integrated controller 110 executes processing illustrated in FIG. 15 before starting the processing illustrated in FIG. 7 based on the detected position information. The integrated controller 110 starts the processing illustrated in FIG. 15 when, for example, the user sets the shift lever of the electric vehicle 1 to park or turns off the ignition, or in response to an operation performed by the user to start the vehicle after stopping the vehicle.

In step S501, the integrated controller 110 causes the external environment recognition unit 120 to acquire position information regarding the position of the electric vehicle 1 from the GPS. In step S502, it is determined whether or not the battery 11 is charged in the home 2 on the basis of the acquired position information. For example, when the acquired position information is within a predetermined region including the home 2, it is determined that the battery 11 is charged in the home 2, and when the acquired position information is outside the predetermined region, it is determined that the battery 11 is not charged in the home 2.

When it is determined in step S502 that the battery 11 is charged in the home 2, the processing proceeds to step S503 to execute the processing illustrated in FIG. 7 described above, that is, execute the charging of the battery 11 accompanied by the generation of a charging plan. On the other hand, when the processing proceeds to step S504 as a result of the determination in step S502 that the battery 11 is not charged in the home 2, charging with smaller one of power specified by a control box included in the charging cable 27 and power specified by the temperature of the battery 11 is performed. When the processing proceeds to step S504, the estimation of the power consumption of the home 2 by the power consumption estimating unit 111 and the generation of the charging plan by the charging power determination unit 112 are not performed.

Meanwhile, the charging plan determined by the charging power determination unit 112 is planned on the basis of the power consumption forecast of the place (home 2) where the user usually performs charging, and thus, the charging plan is inappropriate in a charging place other than the home 2. However, by using the position information acquired by the external environment recognition unit 120 as described above, it is possible to determine whether or not the user starts charging at a place (home or the like) where the user usually performs charging. Then, the process as in step S503 or step S504 is performed according to the position of the electric vehicle 1, whereby it is possible to perform an appropriate charging operation according to the position of the electric vehicle 1.

In addition, when the position information does not indicate the position of the home 2, the processing proceeds from step S502 to step S504, so that the charging plan based on the power consumption estimation value of the home 2 is not generated. Therefore, when charging is performed in a place (using a charger or power) different from the home 2, it is possible to prevent charging based on an inappropriate charging plan (charging plan for performing charging in the home 2).

In the above description, the processing illustrated in FIG. 15 is started when, for example, the user sets the shift lever of the electric vehicle 1 to park or turns off the ignition, or in response to an operation performed by the user to start the vehicle after stopping the vehicle. However, the following process may be performed. First, when the electric vehicle 1 approaches the home 2 and the position information acquired by the GPS device falls within the predetermined region, the processing of FIG. 7 is started. Then, the integrated controller 110 starts the processing illustrated in FIG. 15 when, for example, the user sets the shift lever of the electric vehicle 1 to park or turns off the ignition, or in response to an operation performed by the user to start the vehicle after stopping the vehicle. In this case, in step S503 in FIG. 15, a charging process accompanied by presentation of a charging plan or the like is executed. As a result, the charging plan is presented and the setting of charging can be completed immediately when the electric vehicle 1 arrives at the home 2. Obviously, the charging plan may be presented before the electric vehicle 1 arrives at the home, by which the user can know the charging plan after the arrival in advance.

The case where the first modification is applied to the first embodiment has been described above, but the first modification can be similarly applied to the second and third embodiments.

Second Modification

Figure 16:
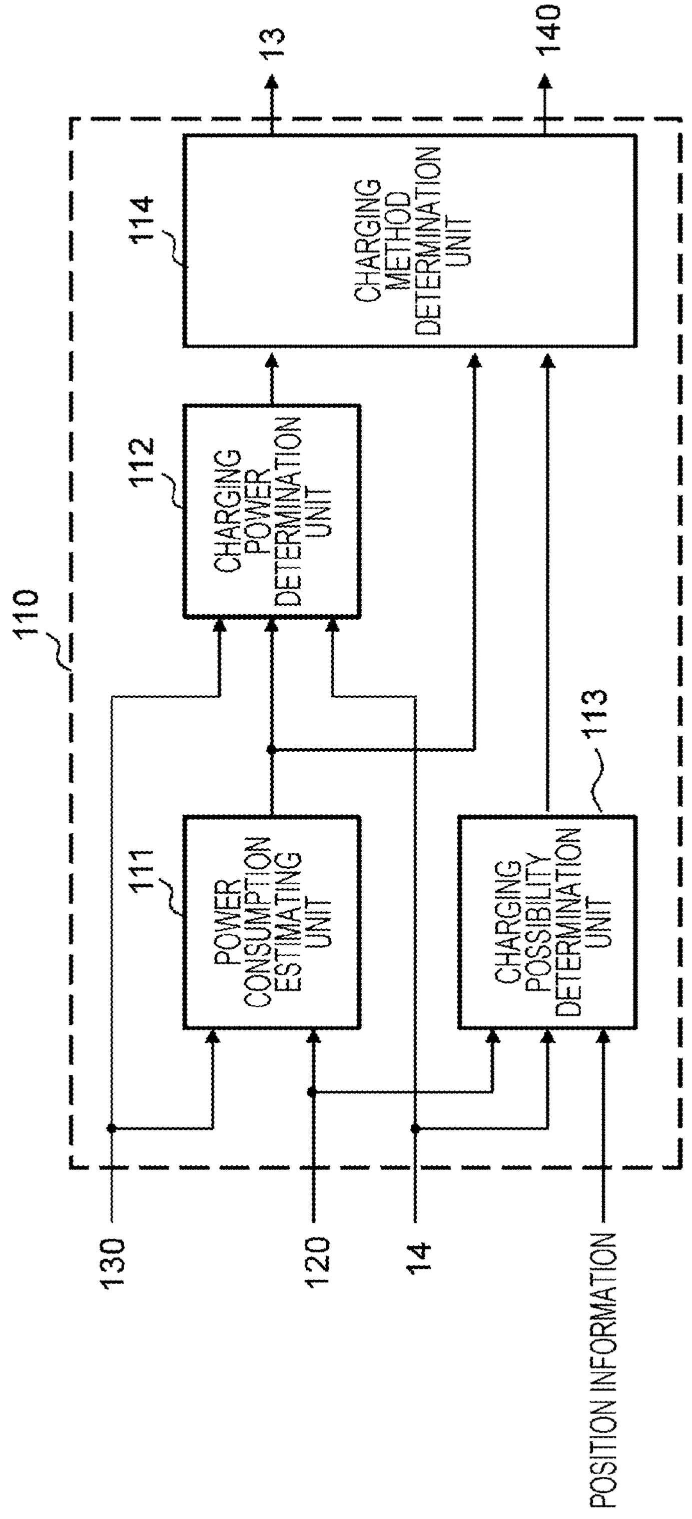
FIG. 16 is a flowchart for describing a second modification.

FIG. 16 is a diagram for describing a second modification, and a functional block diagram of the integrated controller 110. The integrated controller 110 illustrated in FIG. 16 includes a charging possibility determination unit 113 and a charging method determination unit 114 in addition to the power consumption estimating unit 111 and the charging power determination unit 112 illustrated in FIG. 2. The operations of the power consumption estimating unit 111 and the charging power determination unit 112 are similar to those in the case of FIG. 2.

The charging possibility determination unit 113 acquires the state of charge of the battery 11 when charging is performed from the battery sensor 14, and stores the state of charge of the battery 11 at the start of previous charging or the state of charge of the battery 11 at the start of charging in a plurality of past charging processes up to the previous charging.

The charging possibility determination unit 113 makes the following determination regarding the state of charge of the battery 11. The charging possibility determination unit 113 determines that the charging possibility is high in a case where the current state of charge of the battery 11 is lower than the state of charge of the battery at the time of past charging stored in the charging possibility determination unit 113 or lower than the state of charge obtained by adding 5 to 10% of the amount of power at the time of full charge to the state of charge of the battery at the time of past charging. When the above determination is made while the electric vehicle 1 is traveling, a “predicted value of the state of charge of the battery 11 when the electric vehicle 1 arrives at the home 2” is used instead of “the current state of charge of the battery 11”.

In a case where the charging possibility determination unit 113 determines that the charging possibility is high and the period in which the power consumption of the home 2 estimated by the power consumption estimating unit 111 is high is expected to continue for a long time, the charging method determination unit 114 presents information prompting charging in a place other than the home 2 to the user by, for example, the information presentation unit 140 or the like. Here, the state in which the period during which the power consumption of the home 2 is high continues for a long time refers to a case where, when the battery 11 is charged according to the charging plan (output) of the in-vehicle charger 12 determined by the charging power determination unit 112, it takes more than two times the charging time as compared with the case of charging with the rated value of the in-vehicle charger 12.

Note that the value of “two time or more” may be changed according to the preference of the user. The charging time may be 1.5 times or more for a user who does not desire to increase the charging time, and may be four times or more for a user who desires to charge in the home 2. As described above, the numerical value of two in the wording “two times or more” is adjustable, and it is preferable that the numerical value is adjustable in the range of 1 to 5.

As described above, in the second modification, in a case where power consumption in the home 2 is high, information prompting charging in a charging place other than the home is presented to the user to avoid charging in the home 2. As a result, it is possible to prevent a power failure from occurring in the home 2 or an excessively long charging time of the battery 11.

Third Modification

In the third modification, a setting condition of a vehicle air conditioner mounted on the electric vehicle 1 is also used when the power consumption estimating unit 111 generates a power consumption forecast of the home 2. The temperature setting of the vehicle air conditioner when the user is in the electric vehicle 1 depends on the external temperature at that time, but is also affected by how the user feels the temperature.

For example, in a case where the user is sensitive to cold, the temperature setting tends to be higher than that set by a person who is not sensitive to cold. Therefore, when returning to the home 2, the user is likely to set the temperature of an air conditioner in the home 2 higher. In view of this, the power consumption estimating unit 111 estimates the temperature setting of the air conditioner in the home 2 from the temperature setting of the vehicle air conditioner, and generates the power consumption forecast of the home 2.

This scheme is applied as follows. For example, a reference is set for the set temperature of the vehicle air conditioner of the electric vehicle 1, and when the temperature setting of the vehicle air conditioner exceeds the range of 23 to 28° C., the power consumption of the air conditioner is corrected during estimation of the power consumption of the home 2. When the temperature setting is lower than 23° C., the power consumption of the air conditioner during the cooling operation is increased by 10%, and when the temperature exceeding 28° C. is set, the power consumption of the air conditioner during the heating operation is increased by 10%. Under such conditions, the power consumption forecast of the home 2 is calculated. An amount to be corrected may be increased by a predetermined amount when the target value exceeds a predetermined range as described above, or an amount of power corresponding to the error from the reference temperature may be increased or decreased.

As described above, in the third modification, the preference and characteristics of the user who drives the electric vehicle 1 are reflected in the estimation of the power consumption of the home 2, whereby the accuracy of estimating a power consumption estimation value can be improved. In addition, since the accuracy of estimating the power consumption estimation value is improved, it is possible to set the surplus power Wres in the charging plan more strictly, and thus, it is possible to prevent the charging time from being excessively extended.

According to the embodiments and the modifications of the present invention described above, the following operational effects are obtained.

(C1) As illustrated in FIGS. 1 and 2, an in-vehicle charging system 10 that charges a battery 11 mounted on an electric vehicle 1 with electric power supplied from a home 2 includes: an external environment recognition unit 120 that is mounted on the electric vehicle 1 and detects external environment information regarding an external environment around the electric vehicle 1; an information acquiring unit 130 that acquires device information (information regarding an electric load 25) regarding an electric device provided in the home 2; a power consumption estimating unit 111 that calculates a power consumption estimation value (power consumption forecast) of the electric device provided in the home 2 upon charging the battery on the basis of the external environment information and the device information; and a charging power determination unit 112 that determines a charging plan for the battery 11 based on the power consumption estimation value. The charging power determination unit 112 determines the charging plan in such a manner that a sum of charging power of the battery 11 and the power consumption estimation value falls below an upper limit value of electric power (value of electric power at which an ampere breaker 23 operates) consumable in the home 2.

As described above, the power consumption of the home 2 is estimated and the charging plan for the battery 11 is generated on the basis of the information acquired by the external environment recognition unit 120 and the information acquiring unit 130 provided in the in-vehicle charging system 10, whereby it is possible to generate the charging plan by the electric vehicle 1 alone at the time of charging in the home 2.

(C2) In (C1) described above, the in-vehicle charging system 10 further includes an information presentation unit 140 that presents charging information including the charging plan and the power consumption estimation value as illustrated in FIG. 1. Since the power consumption estimation value and the charging plan are presented to the user by the information presentation unit 140, the user can grasp the power consumption estimation value and the charging plan. In addition, the charging information is presented, so that the user can confirm that charging is performed while avoiding the risk of the ampere breaker 23 of the home 2 being thrown. Thus, it is possible to reduce a psychological burden on the user for the risk of an occurrence of a power failure.

(C3) In (C2) described above, the charging power determination unit 112 generates power shortage risk information (power failure risk information) in the home 2 based on the charging plan in addition to determining the charging plan as illustrated in FIGS. 9, 12, and 13. The charging information also includes the power shortage risk information. As illustrated in FIGS. 12 and 13, the information presentation unit 140 presents the power failure risk information to the user in addition to the charging plan (charging power) and the power consumption estimation value (power consumption forecast), so that the user can grasp the power failure risk, the factor causing a situation in which the charging output does not reach the rated capacity, and the like. As a result, it is easy to adjust the charging power while avoiding the power failure.

(C4) In (C2) described above, the in-vehicle charging system 10 further includes a plan modifying unit 150 for modifying the charging plan determined by the charging power determination unit 112 as illustrated in FIG. 9, in which the information presentation unit 140 presents charging information including a modified charging plan modified by the plan modifying unit 150 instead of the charging plan and the power consumption estimation value, when the plan modifying unit 150 performs modification.

The plan modifying unit 150 for modifying the charging plan is provided, whereby the charging power can be adjusted by the user so that the charging time can be further shortened while avoiding the power failure. In addition, the charging information including the modified charging plan is presented to the information presentation unit 140, whereby it is possible to efficiently and effectively adjust the charging power.

(C5) In (C4) described above, the charging information presented by the information presentation unit 140 further includes modification proposal information for the charging plan or the modified charging plan as illustrated in FIGS. 12, 13, etc. By presenting the modification proposal information as described above, the user can easily adjust the charging power or the like with reference to the modification proposal information.

(C6) In (C1) described above, the in-vehicle charging system further includes a record information acquiring unit (telematics unit 160) that acquires information regarding a record of use of the electric device in the home 2 as illustrated in FIG. 14, etc., in which the power consumption estimating unit 111 calculates the power consumption estimation value based on the external environment information, the device information, and the information acquired by the record information acquiring unit (telematics unit 160).

The information regarding the record of use of the electric device in the home 2 is acquired by the telematics unit 160 as described above, whereby the power consumption estimation value can be corrected with reference to the record of use. As a result, the accuracy of estimating the power consumption can be improved, whereby the accuracy of the charging plan can be improved, and the occurrence of a power failure in the home 2 at the time of charging the battery can be reduced. In addition, the accuracy of estimating the power consumption estimation value increases, whereby the surplus power Wres in the charging plan can be reduced to increase the upper limit of the charging power, and the charging time can be prevented from becoming excessively long.

(C7) In (C1) described above, the power consumption estimating unit 111 may calculate the power consumption estimation value based on the external environment information, the device information regarding electric power of the electric device (home appliance) provided in the home 2, and setting information (e.g., temperature setting) regarding setting of a vehicle air conditioner mounted on the electric vehicle 1 as illustrated in FIG. 1, etc. That is, the accuracy of estimating the power consumption estimation value can be enhanced by assuming that the air conditioner in the home 2 will be used in the same manner as the vehicle air conditioner. In addition, since the accuracy of estimating the power consumption estimation value is improved, it is possible to set the surplus power Wres in the charging plan more strictly, and thus, it is possible to prevent the charging time from being excessively extended.

(C8) In (C1) described above, the external environment recognition unit 120 includes an acceleration sensor as illustrated in FIG. 1, etc., and the charging of the battery 11 is stopped when an acceleration detected by the acceleration sensor is equal to or greater than a predetermined value. As described above, in a case where the acceleration equal to or greater than the predetermined value is detected by the acceleration sensor, there is a possibility that an earthquake has occurred or something has collided with the electric vehicle 1. By automatically stopping charging when the acceleration detected during battery charging is equal to or greater than the predetermined value, an occurrence of a secondary disaster such as a fire can be prevented.

(C9) In (C1) described above, the external environment recognition unit 120 includes a position information sensor (e.g., GPS device) that acquires position information regarding a position of the electric vehicle 1, and when the external environment recognition unit 120 detects that a stop position of the electric vehicle 1 is within a predetermined region including the home 2, the calculation of the power consumption estimation value by the power consumption estimating unit 111 and the determination of the charging plan by the charging power determination unit 112 are executed as illustrated in FIG. 15, etc.

The charging plan determined by the charging power determination unit 112 is planned on the basis of the power consumption forecast of the place (home 2) where the user usually performs charging, and thus, the charging plan is inappropriate in a charging place other than the home 2. However, the calculation of the power consumption estimation value and the determination of the charging plan are executed when the stop position of the electric vehicle 1 is within the predetermined region including the home 2 as described above, whereby it is possible to prevent charging with an inappropriate charging plan (charging plan for charging in the home 2) when charging is performed using a place (charger or power) different from the home 2.

(C10) In (C2) described above, the external environment recognition unit 120 includes a position information sensor that acquires position information regarding a position of the electric vehicle 1, and when the external environment recognition unit 120 detects that the position of the electric vehicle 1 is within a predetermined region including the home 2, the calculation of the power consumption estimation value by the power consumption estimating unit 111 and the determination of the charging plan by the charging power determination unit 112 are executed as illustrated in FIG. 15, etc. Then, the information presentation unit 140 presents the charging information including the charging plan and the power consumption estimation value when or before the electric vehicle 1 arrives at the home 2.

The charging plan and the power consumption estimation value are presented when or before the electric vehicle 1 arrives at the home 2, whereby it is possible to complete the setting of charging as the electric vehicle 1 arrives at the home 2. In a case where the charging plan is presented before arrival, the user can know the charging plan after arrival in advance.

(C11) In (C2) described above, the in-vehicle charging system 10 further includes a charging possibility determination unit 113 that determines a possibility of performing charging in the home 2 based on a remaining charge amount of the battery 11, in which the information presentation unit 140 presents information suggesting charging in a place other than the home 2 when the charging possibility determination unit 113 determines that the possibility of charging in the home 2 is high and the power consumption estimation value calculated by the power consumption estimating unit 111 is equal to or greater than a predetermined value, as illustrated in FIG. 16, etc.

As described above, in a case where the power consumption estimation value of the home 2 is equal to or greater than the predetermined value, proposal information prompting charging in a charging place other than the home is presented to the user, by which charging in the home 2 is avoided. As a result, it is possible to prevent a power failure from occurring in the home 2 or an excessively long charging time of the battery 11. Further, in a case where the position of the electric vehicle 1 is within a predetermined region including the home 2 according to, for example, the position information from the GPS device before the electric vehicle 1 arrives at the home 2, the proposal information may be presented to the information presentation unit 140.

By presenting the proposal information in advance in this way, the user can easily address an alternative charging method.

The embodiments and modifications described above are merely examples, and the present invention is not limited by the contents thereof as long as the features of the invention are not impaired. While various embodiments and modifications have been described above, the present invention is not limited to the contents thereof. In addition, the above-described embodiments and modifications may be combined. Other aspects conceivable within the scope of the technical idea of the present invention are also included within the scope of the present invention.

REFERENCE SIGNS LIST

1 electric vehicle
2 home
10 in-vehicle charging system
11 battery
12 in-vehicle charger
14 battery sensor
21 power system
23 ampere breaker
25 electric load
27 charging cable
32 energy management system
110 integrated controller
111 power consumption estimating unit
112 charging power determination unit
113 charging possibility determination unit
114 charging method determination unit
120 external environment recognition unit
130 information acquiring unit
140 information presentation unit
150 plan modifying unit
160 telematics unit

The invention claimed is:

1. An in-vehicle charging system that charges a battery mounted on an electric vehicle with electric power supplied from a home, the in-vehicle charging system comprising:
- an external environment recognition unit that is mounted on the electric vehicle and detects external environment information regarding an external environment around the electric vehicle;
- an information acquiring unit that acquires device information regarding an electric device provided in the home;
- a power consumption estimating unit that calculates a power consumption estimation value of the electric device provided in the home upon charging the battery on the basis of the external environment information and the device information; and
- a charging power determination unit that determines a charging plan for the battery based on the power consumption estimation value, wherein
- the charging power determination unit determines the charging plan in such a manner that a sum of charging power of the battery and the power consumption estimation value falls below an upper limit value of electric power consumable in the home.

2. The in-vehicle charging system according to claim 1, further comprising an information presentation unit that presents charging information including the charging plan and the power consumption estimation value.

3. The in-vehicle charging system according to claim 2, wherein
- the charging power determination unit generates power shortage risk information in the home based on the charging plan in addition to determining the charging plan, and
- the charging information includes the power shortage risk information.

4. The in-vehicle charging system according to claim 2, further comprising
- a plan modifying unit for modifying the charging plan determined by the charging power determination unit, wherein
- the information presentation unit presents charging information including a modified charging plan modified by the plan modifying unit instead of the charging plan and the power consumption estimation value, when the plan modifying unit performs modification.

5. The in-vehicle charging system according to claim 4, wherein the charging information presented by the information presentation unit further includes modification proposal information for the charging plan or the modified charging plan.

6. The in-vehicle charging system according to claim 1, further comprising
- a record information acquiring unit that acquires information regarding a record of use of the electric device in the home, wherein
- the power consumption estimating unit calculates the power consumption estimation value based on the external environment information, the device information, and the information acquired by the record information acquiring unit.

7. The in-vehicle charging system according to claim 1, wherein the power consumption estimating unit calculates the power consumption estimation value based on the external environment information, the device information, and setting information regarding setting of an air conditioner mounted on the electric vehicle.

8. The in-vehicle charging system according to claim 1, wherein
- the external environment recognition unit includes an acceleration sensor, and
- the charging of the battery is stopped when an acceleration detected by the acceleration sensor is equal to or greater than a predetermined value.

9. The in-vehicle charging system according to claim 1, wherein
- the external environment recognition unit includes a position information sensor that acquires position information regarding a position of the electric vehicle, and
- when the external environment recognition unit detects that a stop position of the electric vehicle is within a predetermined region including the home, the calculation of the power consumption estimation value by the power consumption estimating unit and the determination of the charging plan by the charging power determination unit are executed.

10. The in-vehicle charging system according to claim 2, wherein
- the external environment recognition unit includes a position information sensor that acquires position information regarding a position of the electric vehicle,
- when the external environment recognition unit detects that the position of the electric vehicle is within a predetermined region including the home, the calculation of the power consumption estimation value by the power consumption estimating unit and the determination of the charging plan by the charging power determination unit are executed, and the information presentation unit presents the charging information when or before the electric vehicle arrives at the home.

11. The in-vehicle charging system according to claim 2, further comprising a charging possibility determination unit that determines a possibility of performing charging in the home based on a remaining charge amount of the battery, wherein the information presentation unit presents information suggesting charging in a place other than the home when the charging possibility determination unit determines that the possibility of charging in the home is high and the power consumption estimation value calculated by the power consumption estimating unit is equal to or greater than a predetermined value.

* * * * *